(12) United States Patent
King

(10) Patent No.: US 12,175,586 B2
(45) Date of Patent: Dec. 24, 2024

(54) TEXTURE FILTERING OF TEXTURE REPRESENTED BY MULTILEVEL MIPMAP

(71) Applicant: Imagination Technologies Limited, Kings Langley (GB)

(72) Inventor: Rostam King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 97 days.

(21) Appl. No.: 17/871,209

(22) Filed: Jul. 22, 2022

(65) Prior Publication Data

US 2023/0050686 A1   Feb. 16, 2023

(30) Foreign Application Priority Data

Jul. 22, 2021 (GB) ..................................... 2110588

(51) Int. Cl.
*G06T 15/04* (2011.01)
*G06T 7/40* (2017.01)
*G06V 10/25* (2022.01)

(52) U.S. Cl.
CPC ................ *G06T 15/04* (2013.01); *G06T 7/40* (2013.01); *G06V 10/25* (2022.01); *G06T 2207/20024* (2013.01)

(58) Field of Classification Search
CPC ....................... G06T 15/04; G06T 7/40; G06T 2207/20024
See application file for complete search history.

(56) References Cited

U.S. PATENT DOCUMENTS 6,005,582 A    12/1999  Gabriel et al.
7,620,210 B1 *  11/2009  Donovan .............. G06T 11/001
                                                                345/582

(Continued)

OTHER PUBLICATIONS

Ewins et al, "Implementing an anisotropic texture filter." Computers and Graphics, vol. 24, 2000, pp. 253-267.

(Continued)

*Primary Examiner* — Terrell M Robinson
(74) *Attorney, Agent, or Firm* — Potomac Law Group, PLLC; Vincent M DeLuca

(57) ABSTRACT

Texture filtering is applied to a texture represented with a mipmap comprising a plurality of levels, wherein each level of the mipmap comprises an image representing the texture at a respective level of detail. A texture filtering unit has minimum and maximum limits on an amount by which it can alter the level of detail when it filters texels from an image of a single level of the mipmap. The range of level of detail between the minimum and maximum limits defines an intrinsic region of the texture filtering unit. If it is determined that a received input level of detail is in an intrinsic region of the texture filtering unit, texels are read from a single mipmap level of the mipmap, and the read texels from the single mipmap level are filtered to determine a filtered texture value representing part of the texture at the input level of detail. If it is determined that the received input level of detail is in an extrinsic region of the texture filtering unit: texels are read from two mipmap levels of the mipmap, and the read texels from the two mipmap levels are processed to determine a filtered texture value representing part of the texture at the input level of detail.

20 Claims, 9 Drawing Sheets

(56) References Cited

U.S. PATENT DOCUMENTS

| | | | |
|---|---|---|---|
| 2003/0030646 A1 | 2/2003 | Yeh | |
| 2006/0158451 A1* | 7/2006 | Barenbrug | G06T 15/04 345/582 |
| 2008/0303841 A1 | 12/2008 | Newhall, Jr. | |
| 2010/0027911 A1* | 2/2010 | Lefebvre | G06T 3/14 345/426 |
| 2012/0082396 A1* | 4/2012 | Crandall | G06T 3/403 382/254 |
| 2012/0169755 A1* | 7/2012 | Comparan | G06T 15/04 345/582 |
| 2014/0267346 A1* | 9/2014 | Ren | G06T 15/04 345/582 |
| 2021/0118196 A1 | 4/2021 | King | |

OTHER PUBLICATIONS

Mavridis et al, "High quality elliptical texture filtering on GPU," Computer Architecture (ISCA), 2011, pp. 23-30.

McCormack et al, "Simple and Table Feline: Fast Elliptical Lines for Anisotropic Texture Mapping," WRL Research Report 99/1, 1999, pp. 1-16.

* cited by examiner

TEXTURE FILTERING OF TEXTURE REPRESENTED BY MULTILEVEL MIPMAP

FIELD

The present disclosure relates to texture filtering.

BACKGROUND

In computer graphics, texturing is frequently used to add surface detail to objects within a scene to be rendered. Textures are typically stored as images, which are accessed to return a colour value for a pixel being processed. To obtain a texture colour value for a pixel, the values of multiple texels of the texture may be sampled, and the sampled texel values may then be filtered to obtain a final texture value for the pixel.

Typically a single pixel of an image being rendered does not map exactly to a single texel of the texture due to the projection of the texture onto 3D geometry within the image. For example, for textured pixels depicting a relatively close view of the texture, each pixel may be associated with a footprint which maps onto a relatively small region of a texture, e.g. covering zero or one texel, whereas for textured pixels depicting a relatively far view of the texture, each pixel may be associated with a footprint which maps onto a relatively large region of a texture, e.g. covering many (e.g. two or more) texels.

In some situations, anisotropic texture filtering may be performed. Anisotropic texture filtering recognises that the sampling rate of the texture, which depends on the mapping from screen-space (in which the image is depicted and the pixel coordinates defined) to texture space (in which the texture is depicted and the texel coordinates defined), is a function of the direction of travel in screen space. In other words, the optimal texture sampling rate may be different along different directions of travel, or axes, in screen space. When this is the case, the mapping between screen space and texture space may be said to be anisotropic. An example of an anisotropic mapping is the 3D projection of planar texture surfaces near the horizon, or any other situation in which a texture is applied to a surface in the scene which is significantly angled away from the viewpoint.

For anisotropic texture mappings, a sampling kernel in texture space mapped to a pixel in screen space is elongated along a certain axis in texture space, with the direction of this axis being dependent on the mapping between screen space and texture space. This is illustrated schematically in FIG. 1, which shows an image 100 formed of pixels having coordinates defined in image space, and a texture 102 formed of texels having coordinates defined in texel space. Image 100 includes an object 104 having surface detail specified by the texture 102, i.e. the texture 102 is mapped to the surface of the object 104. Remaining objects within the image 100 have been omitted for the purposes of clarity. Object 104 is at an oblique viewing angle within the image 100. As mentioned above, if a texture is applied to geometry which is at an oblique angle relative to the viewing direction, then an isotropic footprint for a pixel in image space maps to an anisotropic footprint in texture space. Consequently, the shape of the footprint of a texture-mapped pixel within the image 100 is not maintained in the mapping to texture space. Numeral 106 denotes the pixel footprint in image space, which is circular, and numeral 108 denotes the corresponding pixel footprint in texel space. It can be seen that the footprint has been elongated in texture space to form an ellipse such that it is anisotropic. In general, the mapping of a pixel with a circular footprint in image space to texture space can be approximated by an ellipse, insofar as the texture mapping itself can be approximated by an affine mapping at the pixel's origin. Here, it is noted that the term 'footprint' as used with respect to pixels does not necessarily refer to the physical shape of the pixel in a display device, but may refer to the area of a pixel filter used to construct the final pixel value for that pixel. The pixel's footprint in texture space may therefore be said to be equivalent to the sampling kernel in texture space for the pixel; i.e. the footprint in texture space identifies the texels to be sampled and filtered to form the texture colour value for the pixel.

One approach to performing texture filtering uses mipmaps. A texture stored as a mipmap comprises a sequence of images, each of which is a progressively lower resolution representation of a base texture. Mipmaps are used to increase the speed of rendering by performing some of the resampling of the texture off-line. For example when a texture is created, the creator of the texture may form the different images of the mipmap, e.g. by progressively filtering a source image with a 2×2 box filter such that the image at each mipmap level is half the width and half the height of the image at the preceding mipmap level. Each of the images in the mipmap may be referred to as a 'MIP map level', and has a particular 'level of detail' (LOD) which indicates a resolution at which it represents the same base texture.

To render an image using a MIP map, trilinear filtering may be used. Trilinear filtering comprises a combination of two bilinear filtering operations followed by a linear interpolation (or blend). To render an image at a particular resolution (or level of detail) according to a trilinear filtering approach, bilinear filtering is used to reconstruct a continuous image from each of the two closest MIP map levels (i.e. the one at a higher resolution than the required resolution and the one at a lower resolution than the required resolution) and then linear interpolation (or blending) is used to produce an image at the intermediate, and required, resolution.

When implementing a texture filtering process there are (often competing) aims of: (i) improving the quality of the filtered texture values, and (ii) improving the efficiency of the texture filtering, e.g. in terms of processing latency, power consumption or silicon area (if the texture filtering is implemented in hardware, e.g. fixed function circuitry).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of applying texture filtering to a texture using a texture filtering unit, wherein the texture is represented with a mipmap comprising a plurality of levels, wherein each level of the mipmap comprises an image representing the texture at a respective level of detail, wherein the texture filtering unit has minimum and maximum limits on an amount by which it can alter the level of detail when it filters texels from an image of a single level of the mipmap, wherein the range of level of detail between the minimum and maximum limits defines an intrinsic region of the texture filtering unit, and wherein levels of detail outside of the range of level of detail between the minimum and maximum limits define an extrinsic region of the texture filtering unit, the method comprising:

receiving an input level of detail for filtering the texture;

determining whether the received input level of detail is in an intrinsic region or an extrinsic region of the texture filtering unit;

if it is determined that the received input level of detail is in an intrinsic region of the texture filtering unit:

reading texels from a single mipmap level of the mipmap; and filtering the read texels from the single mipmap level with the texture filtering unit to determine a filtered texture value representing part of the texture at the input level of detail; and if it is determined that the received input level of detail is in an extrinsic region of the texture filtering unit:

reading texels from two mipmap levels of the mipmap; and processing the read texels from the two mipmap levels with the texture filtering unit to determine a filtered texture value representing part of the texture at the input level of detail.

A first of the two mipmap levels may be associated with a first intrinsic region of the texture filtering unit, wherein a second of the two mipmap levels may be associated with a second intrinsic region of the texture filtering unit, and wherein said processing the read texels from the two mipmap levels with the texture filtering unit may comprise:

filtering the read texels from the first of the two mipmap levels with the texture filtering unit to determine a first intermediate filtered texture value at a first intermediate level of detail within the first intrinsic region of the texture filtering unit;

filtering the read texels from the second of the two mipmap levels with the texture filtering unit to determine a second intermediate filtered texture value at a second intermediate level of detail within the second intrinsic region of the texture filtering unit; and determining a filtered texture value representing part of the texture at the input level of detail by using the input level of detail to interpolate between the first intermediate filtered texture value at the first intermediate level of detail and the second intermediate filtered texture value at the second intermediate level of detail.

The texture filtering unit may have a plurality of intrinsic regions and extrinsic regions, wherein there may be an intrinsic region and an extrinsic region for each of a plurality of the mipmap levels of the mipmap.

The texture filtering unit may perform filtering in accordance with a filtering function which is non-negative, normalised and has a mean value of zero.

The texture filtering unit may be configured to filter texels using a filter kernel, wherein it may be the case that values of the filter kernel can be varied to alter a variance of the filtering performed by the texture filtering unit so as to vary the amount by which the level of detail is altered between the minimum and maximum limits, and wherein the method may comprise setting the values of the filter kernel based on the received input level of detail to control the amount by which it alters the level of detail when it filters the texels.

The filter kernel may be represented with a filter matrix. The filter matrix may be a 2×2 matrix, a 3×3 matrix or a 4×4 matrix.

Said determining whether the received input level of detail is in an intrinsic region or an extrinsic region of the texture filtering unit may comprise:

determining a first indication of a mipmap level, $d_{hi}$, such that $d_{hi} = \lfloor d_I - p_{min}^\lambda \rfloor$; and determining a second indication of a mipmap level, $d_{lo}$, such that $d_{lo} = \lceil d_I - p_{max}^\lambda \rceil$;

wherein $d_I$ is the received input level of detail, $p_{min}^\lambda$ is the minimum limit and $p_{max}^\lambda$ is the maximum limit, and wherein the received input level of detail is in an intrinsic region if $d_{hi} = d_{lo}$, and wherein the received input level of detail is in an extrinsic region if $d_{hi} \neq d_{lo}$.

For example, $0 \leq p_{min}^\lambda \leq p_{max}^\lambda < 1$.

If it is determined that the received input level of detail is in an intrinsic region of the texture filtering unit:

texels may be read from the single mipmap level of the mipmap indicated by $d_{hi}$ and $d_{lo}$; and a parameter $p^\lambda$ may be set to determine the amount by which the level of detail is altered from the single mipmap level with the texture filtering unit, wherein $p^\lambda = d_I - d_{hi} = d_I - d_{lo}$.

If it is determined that the received input level of detail is in an extrinsic region of the texture filtering unit:

texels may be read from the two mipmap levels of the mipmap indicated by $d_{hi}$ and $d_{lo}$;

a parameter $p_{hi}^\lambda$ may be set to determine the amount by which the level of detail is altered from a first of the two mipmap levels indicated by $d_{hi}$ with the texture filtering unit; and a parameter $p_{lo}^\lambda$ may be set to determine the amount by which the level of detail is altered from a second of the two mipmap levels indicated by $d_{lo}$ with the texture filtering unit.

For example, $p_{hi}^\lambda = p_{max}^\lambda$ and $p_{lo}^\lambda = p_{min}^\lambda$.

If it is determined that the received input level of detail is in an extrinsic region of the texture filtering unit the method may further comprise setting an interpolation factor $\delta$ for interpolating between the first intermediate filtered texture value at the first intermediate level of detail and the second intermediate filtered texture value at the second intermediate level of detail, wherein the first intermediate level of detail may be $d_{hi} + p_{hi}^\lambda$ and the second intermediate level of detail may be $d_{lo} + p_{lo}^\lambda$, and wherein $$\delta = \frac{d_I - p_{max}^\lambda - d_{hi}}{1 - (p_{max}^\lambda - p_{min}^\lambda)}.$$

The method may further comprise:

receiving a bias parameter indicating a width of a filter used to generate the images at the mipmap levels of the mipmap; and adjusting the minimum and maximum limits of the texture filtering unit based on the received bias parameter.

The texture filtering unit may be configured to apply anisotropic filtering using a filter kernel which can be adapted to apply different amounts of anisotropy up to a maximum amount of anisotropy, wherein the method may comprise:

receiving an indication of an input amount of anisotropy and an input direction of anisotropy for filtering the texture;

determining whether the input amount of anisotropy is above the maximum amount of anisotropy;

if it is determined that the input amount of anisotropy is not above the maximum amount of anisotropy:

configuring the filter kernel to apply the input amount of anisotropy; and performing a sampling operation to sample texels using the filter kernel to determine a filtered texture value which has been filtered in accordance with the input amount of anisotropy and the input direction of anisotropy; and if it is determined that the input amount of anisotropy is above the maximum amount of anisotropy:
    configuring the filter kernel to apply an amount of anisotropy that is not above the maximum amount of anisotropy;
    performing a plurality of sampling operations to sample texels using the filter kernel to determine a respective plurality of intermediate filtered texture values; and
    combining the plurality of intermediate filtered texture values to determine a filtered texture value which has been filtered in accordance with the input amount of anisotropy and the input direction of anisotropy.

Said combining the plurality of intermediate filtered texture values may comprise performing a weighted sum of the intermediate filtered texture values.

The determined filtered texture value may be used for rendering an image of a scene in which the texture is applied to a surface in the scene.

There is provided a texture filtering unit configured to apply texture filtering to a texture,
    wherein the texture is represented with a mipmap comprising a plurality of levels, wherein each level of the mipmap comprises an image representing the texture at a respective level of detail, wherein the texture filtering unit has minimum and maximum limits on an amount by which it can alter the level of detail when it filters texels from an image of a single level of the mipmap, wherein the range of level of detail between the minimum and maximum limits defines an intrinsic region of the texture filtering unit, and wherein levels of detail outside of the range of level of detail between the minimum and maximum limits define an extrinsic region of the texture filtering unit, the texture filtering unit being configured to:
        receive an input level of detail for filtering the texture;
        determine whether the received input level of detail is in an intrinsic region or an extrinsic region of the texture filtering unit;
        if it is determined that the received input level of detail is in an intrinsic region of the texture filtering unit:
            read texels from a single mipmap level of the mipmap; and
            filter the read texels from the single mipmap level to determine a filtered texture value representing part of the texture at the input level of detail; and
        if it is determined that the received input level of detail is in an extrinsic region of the texture filtering unit:
            read texels from two mipmap levels of the mipmap; and
            process the read texels from the two mipmap levels to determine a filtered texture value representing part of the texture at the input level of detail.

A first of said two mipmap levels may be associated with a first intrinsic region of the texture filtering unit, wherein a second of said two mipmap levels may be associated with a second intrinsic region of the texture filtering unit, and wherein the texture filtering unit may be configured to process the read texels from the two mipmap levels if it is determined that the received input level of detail is in an extrinsic region of the texture filtering unit by:
    filtering the read texels from the first of the two mipmap levels to determine a first intermediate filtered texture value at a first intermediate level of detail within the first intrinsic region;
    filtering the read texels from the second of the two mipmap levels to determine a second intermediate filtered texture value at a second intermediate level of detail within the second intrinsic region; and
    determining a filtered texture value representing part of the texture at the input level of detail by using the input level of detail to interpolate between the first intermediate filtered texture value at the first intermediate level of detail and the second intermediate filtered texture value at the second intermediate level of detail.

The texture filtering unit may have a plurality of intrinsic regions and extrinsic regions, wherein there may be an intrinsic region and an extrinsic region for each of a plurality of the mipmap levels of the mipmap.

The texture filtering unit may be configured to apply anisotropic filtering using a filter kernel which can be adapted to apply different amounts of anisotropy up to a maximum amount of anisotropy, wherein the texture filtering unit may be further configured to:
    receive an indication of an input amount of anisotropy and an input direction of anisotropy for filtering the texture;
    determine whether the input amount of anisotropy is above the maximum amount of anisotropy;
    if it is determined that the input amount of anisotropy is not above the maximum amount of anisotropy:
        set the filter kernel to apply the input amount of anisotropy; and
        perform a sampling operation to sample texels using the filter kernel to determine a filtered texture value which has been filtered in accordance with the input amount of anisotropy and the input direction of anisotropy; and
    if it is determined that the input amount of anisotropy is above the maximum amount of anisotropy:
        set the filter kernel to apply an amount of anisotropy that is not above the maximum amount of anisotropy;
        perform a plurality of sampling operations to sample texels using the filter kernel to determine a respective plurality of intermediate filtered texture values; and
        combine the plurality of intermediate filtered texture values to determine a filtered texture value which has been filtered in accordance with the input amount of anisotropy and the input direction of anisotropy.

The texture filtering unit may be further configured to output the determined filtered texture value for use in rendering an image of a scene in which the texture is applied to a surface in the scene.

There may be provided a graphics processing unit comprising a texture filtering unit as described herein, wherein the graphics processing unit may be configured to use the filtered texture value determined by the texture filtering unit to render an image of a scene in which the texture is applied to a surface in the scene.

There may be provided a method of applying anisotropic texture filtering to a texture using a texture filtering unit, wherein the texture filtering unit is configured to apply anisotropic filtering using a filter kernel which can be adapted to apply different amounts of anisotropy up to a maximum amount of anisotropy, the method comprising:
    receiving an indication of an input amount of anisotropy and an input direction of anisotropy for filtering the texture;
    determining whether the input amount of anisotropy is above the maximum amount of anisotropy;
    if it is determined that the input amount of anisotropy is not above the maximum amount of anisotropy:
        configuring the filter kernel to apply the input amount of anisotropy; and
        performing a sampling operation to sample texels of the texture using the filter kernel to determine a filtered texture value which has been filtered in accordance with the input amount of anisotropy and the input direction of anisotropy; and if it is determined that the input amount of anisotropy is above the maximum amount of anisotropy:

configuring the filter kernel to apply an amount of anisotropy that is not above the maximum amount of anisotropy;

performing a plurality of sampling operations to sample texels of the texture using the filter kernel to determine a respective plurality of intermediate filtered texture values; and combining the plurality of intermediate filtered texture values to determine a filtered texture value which has been filtered in accordance with the input amount of anisotropy and the input direction of anisotropy.

There may be provided a texture filtering unit configured to apply anisotropic texture filtering to a texture, using a filter kernel which can be adapted to apply different amounts of anisotropy up to a maximum amount of anisotropy, the texture filtering unit being configured to:

receive an indication of an input amount of anisotropy and an input direction of anisotropy for filtering the texture;

determine whether the input amount of anisotropy is above the maximum amount of anisotropy;

if it is determined that the input amount of anisotropy is not above the maximum amount of anisotropy:

configure the filter kernel to apply the input amount of anisotropy; and perform a sampling operation to sample texels of the texture using the filter kernel to determine a filtered texture value which has been filtered in accordance with the input amount of anisotropy and the input direction of anisotropy; and if it is determined that the input amount of anisotropy is above the maximum amount of anisotropy:

configure the filter kernel to apply an amount of anisotropy that is not above the maximum amount of anisotropy;

perform a plurality of sampling operations to sample texels of the texture using the filter kernel to determine a respective plurality of intermediate filtered texture values; and combine the plurality of intermediate filtered texture values to determine a filtered texture value which has been filtered in accordance with the input amount of anisotropy and the input direction of anisotropy.

There is provided a texture filtering unit configured to perform methods described herein.

The texture filtering unit may be embodied in hardware on an integrated circuit. There may be provided a method of manufacturing, at an integrated circuit manufacturing system, a texture filtering unit or a graphics processing unit comprising a texture filtering unit as described herein. There may be provided an integrated circuit definition dataset that, when processed in an integrated circuit manufacturing system, configures the system to manufacture a texture filtering unit or a graphics processing unit comprising a texture filtering unit as described herein. There may be provided a non-transitory computer readable storage medium having stored thereon a computer readable description of a texture filtering unit (or a graphics processing unit comprising a texture filtering unit as described herein) that, when processed in an integrated circuit manufacturing system, causes the integrated circuit manufacturing system to manufacture an integrated circuit embodying a texture filtering unit (or a graphics processing unit comprising a texture filtering unit as described herein).

There may be provided an integrated circuit manufacturing system comprising: a non-transitory computer readable storage medium having stored thereon a computer readable description of the texture filtering unit or the graphics processing unit; a layout processing system configured to process the computer readable description so as to generate a circuit layout description of an integrated circuit embodying the texture filtering unit or the graphics processing unit; and an integrated circuit generation system configured to manufacture the texture filtering unit or the graphics processing unit according to the circuit layout description.

There may be provided computer program code for performing any of the methods described herein. In other words, there may be provided computer readable code configured to cause any of the methods described herein to be performed when the code is run. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
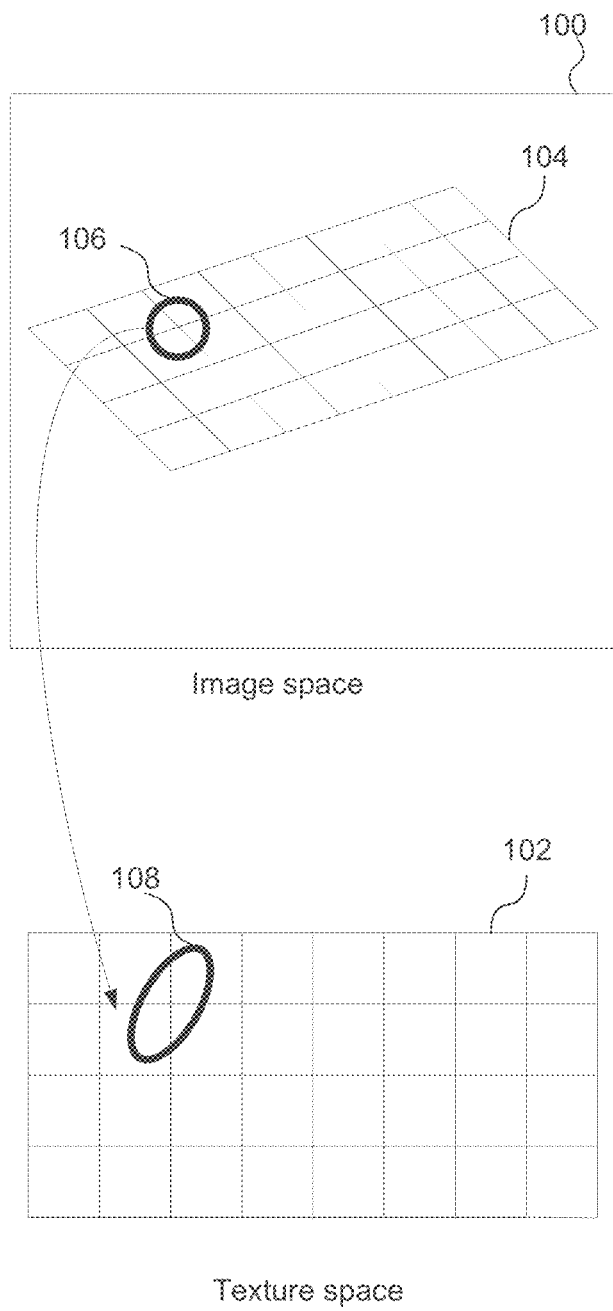
FIG. 1 shows a schematic illustration of a mapping of a sampling kernel between screen space and texture space.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common refer-

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Texture filtering units are described herein which may be referred to as "Parametric Texture Filters" because they can receive parameters, such as an input level of detail, an input amount of anisotropy and an input direction of anisotropy, and can provide filtered texture values which (within certain ranges) can alter the level of detail and/or the amount of anisotropy when it determines the filtered texture values. The texture filtering unit described herein can accelerate variable rate texture resampling with flexible quality and performance trade-offs.

First there is provided a description of a texture filtering approach which forms a foundation on which examples described herein build.

Texture mapping is a variable rate sampling problem. Its typical application in 3D graphics is to represent surface properties of geometric objects in terms of (typically 2D) fields. These fields or "textures" as they are generally known, undergo some distortion as they are mapped first onto geometry and then (for first order interactions) projected onto a viewing frustum that depicts some scene in a rendered image. This rendered image is expressed in terms of a set of sample points in the plane, which in turn determine a set of sampling kernels against which the image plane is integrated to provide high fidelity. As the inverse mapping from the image plane to the texture is generally neither uniform nor static, a range of sampling kernel scales and shapes (at least if one wishes to avoid objectionable artefacts) are accommodated. Outside of 3D graphics, texture mapping can be seen as the application of resampling to any image that undergoes some (nearly) arbitrary coordinate transformation.

Figure 2:
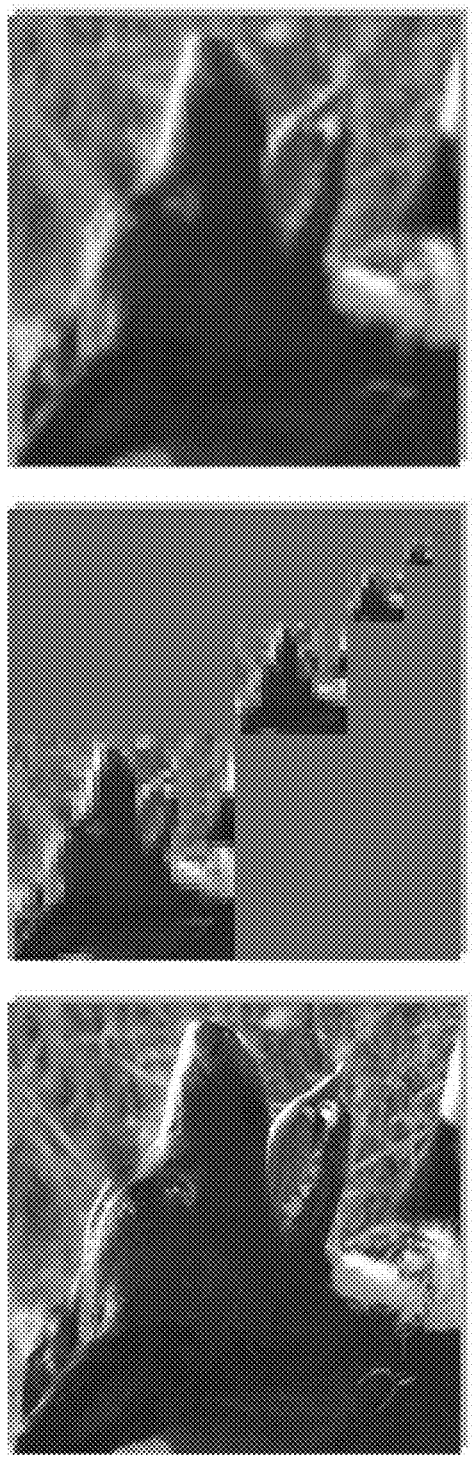
FIG. 2 shows example images representing different stages of a first texture filtering pipeline.
Figure 2:
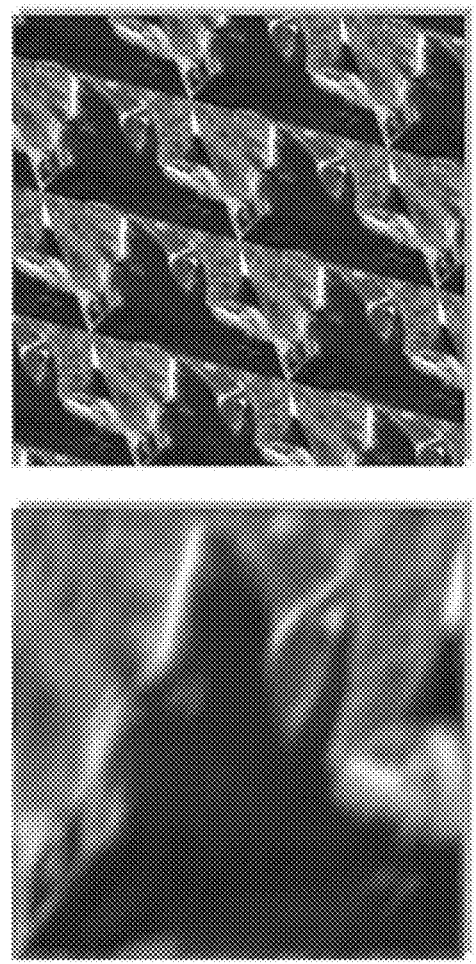

FIG. 2 shows example images representing different stages of a texture filtering pipeline which facilitates variable rate sampling, while maintaining feasible bounds on bandwidth and computational complexity. It has four stages: (a) mipmap generation in which a mipmap (as shown, with exaggerated pixelization, in FIG. 2(ii)) is generated from the source image (as shown in FIG. 2(i)), (b) texture filtering in which an isotropic texture (as shown in FIG. 2(iii)) is generated from the mipmap, (c) anisotropic filtering in which multiple isotropic texture samples are combined to form an anisotropic texture (as shown in FIG. 2(iv)), and (d) texture mapping in which the texture is mapped onto a surface in image space to form part of a rendered image (as shown in FIG. 2(v)). These four stages are described in more detail below.

In the mipmap generation stage, the source image (as shown in FIG. 2(i)) is sampled and stored as a set of images (e.g. bitmaps) at a range of resolutions. Normally, the creator of the texture will generate the mipmap representing the texture. Therefore, normally (but not necessarily) the generation of the mipmap is performed before the time at which the texture is to be applied to a surface for rendering an image, and the generation of the mipmap is normally (but not necessarily) performed by a processing unit which is not the same as the processing unit on which a texturing filtering unit is implemented for applying the texture to a surface. A mipmap representing a texture comprises a plurality of levels, wherein each level of the mipmap comprises an image representing the texture at a respective level of detail. According to some graphics rendering standards (such as OpenGL® and Vulkan®) each successive mipmap level comprises an image (e.g. a bitmap) representing the source image that is half the size (in each dimension) of the image at the preceding mipmap level of the mipmap. The memory footprint (for 2D textures) is thus asymptotically an additional one third of the base level. In principle, any set of bitmaps of arbitrary resolution could be employed, provided each image was supplied with a specific level of detail (LOD), but this structure would exist outside of the current graphics rendering standards.

The standard structure of mipmaps assigns an integer LOD to each image (zero for the highest resolution and increasing by one for each adjacent level) such that it furnishes a logarithmic indication of the scale of the sampling kernel that was (presumably) used to generate each mipmap level. The current graphics rendering standards do not impose restrictions on the means by which the image of each mipmap level is generated, but uniform spectral characteristics can in general only be guaranteed by using a kernel scaling that tracks with the level of detail (assuming an infinite resolution source image). Mipmaps enable the selection of suitable levels of detail to place an upper bound on the number of texels covered by a kernel, thereby reducing both bandwidth and computation.

In other words, mipmaps are used where we want to apply textures to surfaces at various levels of detail. A Mipmap comprises a sequence of images representing the texture at respective levels of detail. Mipmaps can be pre-computed, i.e. computed before sampling the texture. The lowest level of the mipmap (level 0) represents the original texture. Each higher level of the mipmap is a downsized representation of the previous level. For example, the width and height of the image at mipmap level x may be double the width and height of the image at mipmap level (x+1). Each texel at mipmap level (x+1) can be generated by averaging four texels in mipmap level x. For example, a 2D mipmap may be generated via the recursion (with $c_{LOD}(m,n)$ the colour value at integer mipmap level LOD and at integer coordinates (m, n)):

$$c_{LOD+1}(m, n) = \frac{1}{4}(c_{LOD}(2m, 2n) + c_{LOD}(2m+1, 2n) + c_{LOD}(2m, 2n+1) + c_{LOD}(2m+1, 2n+1))$$

This equation represents a simple average of four neighbouring texels. This recursion method works when the mipmaps are a power of two along each of the dimensions, at least up to the number of mipmap levels that are generated (so that the number of texels along each axis is exactly half that of the previous level). The mipmap generation method may simply stop generating additional mipmap levels when this condition fails i.e. when the current mipmap level has at least one odd dimension length. For such a power of two of texture, it's not important whether each successive mipmap level is generated solely from the previous, or whether the recursion above is expanded into an average of a larger footprint on the base texture (e.g. an average of a 4×4 footprint of the level 0 image for generating the level 2 image, or an average of an 8×8 footprint of the level 0 image for generating the level 3 image, etc.).

More generally, a mipmap is a chain of uniformly sampled (in terms of sample spacing) images, where each successive "level of detail" has fewer samples than the previous, so that as the level of detail increases, the resolution of the image decreases.

For an image with base level width, height, (depth), the standard definition of mipmaps is such that:

$$width_{LOD+1} = \max\left(\left\lfloor\frac{width_{LOD}}{2}\right\rfloor, 1\right)$$

$$height_{LOD+1} = \max\left(\left\lfloor\frac{height_{LOD}}{2}\right\rfloor, 1\right)$$

$$\left(depth_{LOD+1} = \max\left(\left\lfloor\frac{depth_{LOD}}{2}\right\rfloor, 1\right)\right)$$

According to one interpretation of a mipmap, the image is assumed (for the sake of re-sampling) to be defined over a square interval $[0,1]^{Dim}$ with sample locations $s_{LOD}: \mathbb{N}^{Dim} \to \mathbb{R}^{Dim}$ given by $$\text{(when } Dim = 3\text{) } s_{LOD} = \left(\frac{i+\frac{1}{2}}{width_{LOD}}, \frac{j+\frac{1}{2}}{height_{LOD}}, \frac{k+\frac{1}{2}}{depth_{LOD}}\right).$$

This is not the only way one can define a chain of mipmaps, and in a second interpretation, samples are placed along the boundaries of the interval, such that $$s_{LOD} = \left(\frac{i}{width_{LOD}-1}, \ldots\right) \text{ and } width_{LOD+1} = \max\left(\left\lceil\frac{width_{LOD}}{2}\right\rceil, 2\right),$$

which, may be referred to as "corner-sampled images".

In the texture filtering stage an isotropic texture (as shown in FIG. 2(iii)) is generated from the mipmap (as shown in FIG. 2(ii)). In this stage the image mipmap is convolved with a set of predefined isotropic filters. Different types of texture filtering may be used in this stage, such as nearest neighbour (or uniform) sampling, bilinear interpolation for 2D textures, trilinear interpolation for 3D textures, or even higher order filtering such as bicubic filtering. The filters performing this texture filtering stage may be considered to be reconstruction filters in the sense that the texture has non-trivial (i.e. generally nonzero) values over its continuous image domain after the application of these filters, whereas the mipmaps are only defined (or nonzero) on the sample grid. The reconstruction can also be thought to extend along the level of detail axis using nearest neighbour or linear interpolation between adjacent mipmap levels. The predominant combination of bilinear filtering of 2D mipmap levels with linear mipmap interpolation is what is commonly meant when the term "trilinear" texture filtering is used. This filter is preferred because it provides continuity of interpolated values, while minimising texel requests from the relevant mipmap levels.

When a texture is to be sampled, a desired level of detail (LOD) (or "input LOD") at which we want to apply the texture is determined. Then the texture filtering unit will try to find a level of the mipmap which matches the LOD. Typically, the desired LOD will fall somewhere between the levels of detail of two of the levels of the mipmap. As mentioned above, two previous filtering approaches are: (i) nearest neighbour filtering, and (ii) trilinear filtering. Nearest neighbour filtering involves finding the level of the mipmap which has the closest LOD to the desired LOD, and then sampling the image of the mipmap at that level (e.g. by performing bilinear interpolation within that level of the mipmap (e.g. using a 2×2 quad of texel values)) to determine a sampled texel value. Trilinear filtering involves performing a bilinear interpolation within the two adjacent levels of the mipmap which have LODs either side of the desired LOD to determine two interpolated values, and then performing a linear interpolation (i.e. a blend or weighted sum) of the two interpolated values to determine the sampled texel value at the desired LOD. Trilinear filtering is used in current state of the art texture filters to provide high quality texture filtering, but artefacts are still sometimes present in the resultant images. Therefore, in a trilinear texture filter, images of two mipmap levels are transformed into a function defined over all real numbers in the square interval by convolution with the texture filter, and then intermediate levels of detail are achieved either by linear interpolating those continuous levels of detail, or the result is snapped to the closest integral level of detail.

In the anisotropic filtering stage, multiple isotropic texture samples (e.g. texels of the isotropic texture shown in FIG. 2(iii)) are combined to form an anisotropic texture (as shown in FIG. 2(iv)). The anisotropic filtering stage may be optional, i.e. some texture filters do not include this stage, but the anisotropic filtering stage is useful for creating crisp images, particularly for oblique projections of the texture onto surfaces in the scene being rendered, or otherwise locally anisotropic mappings. This stage leverages the pre-computation of mipmaps to reduce the dimensionality of the convolution used when a filter kernel cannot be adequately described purely in terms of an isotropic scale factor. A level of detail can be chosen corresponding to the length of the minor axis of the kernel and a discrete convolution can be performed along the major axis such that a number of (isotropic texture filter) samples proportional to the anisotropic ratio (of the major axis length to the minor axis length) is sufficient to produce high quality results. This stage may be evaluated before or after image reconstruction along the level of detail axis; the anisotropic kernel may be separately convolved with each reconstructed mipmap level (which would then be interpolated according to the mipmap filter) or the convolution may be performed directly on a continuous level of detail where each texture filter sample may, for example, represent a trilinear filtered point. To bound the convolution, limits are chosen for the maximum supported anisotropic ratio (e.g. some of the graphics rendering standards define a minimum maximum supported ratio limit of 16) by the application. If the computed anisotropic ratio exceeds these limits, then the minor axis of the kernel is enlarged (generally leading to a higher value for the LOD) such that the ratio is effectively clamped to an upper limit. The anisotropic filter is disabled if the maximum ratio is set to one, which is effectively an isotropic filter. Note that the standards make no requirements of the exact form of the anisotropic filter.

In other words, anisotropic filtering techniques tend to sample the texture with an isotropic filtering kernel at multiple points along a line in texture space and combine the results to determine anisotropically filtered samples. For example, a set of samples can be uniformly averaged across some approximation of the major axis. The texture filtering techniques described herein can be performed in hardware, e.g. using fixed function circuitry.

In the texture mapping stage, the texture (e.g. the result of anisotropic texturing filtering as shown in FIG. 2(iv) or the result of the texture filtering as shown in FIG. 2(*iii*) if anisotropic filtering is not to be applied) is mapped onto a surface in image space to form part of a rendered image (as shown in FIG. 2(*v*)). So this texture mapping stage determines the relationship between Texture space coordinates and screen space coordinates. It may be evaluated via an inverse mapping in which texture coordinates are calculated for each screen space sample (the calculation can be the arbitrary result of some shader code). As an example, under normal conditions, the Jacobian of the mapping is estimated from neighbouring texture coordinates and this is used to determine the parameters of the sampling kernel in texture space. However, a number of modes exist where these parameters may be specified directly by the application. In any case, in examples described herein, the results of the preceding filtering stages, after mipmap generation, which is performed offline, are only evaluated at texture coordinate locations that map to screen space sample locations. Although logically the operations are composed as a set of forward convolutions, the evaluation is executed in reverse (i.e. for each screen-space fragment, a corresponding texture coordinate is calculated).

Each of the four stages described above with reference to FIG. 2 has sought to minimise the computational complexity and/or bandwidth needed to generate a set of appropriate filtered samples of sufficient quality for the purpose the application has in mind. However, it is still possible to explore finer grained trade-offs by adjusting the operation and balance of work between namely the texture and anisotropic filtering stages. In particular, the specification of a texture filter may affect:

Mipmap bandwidth: An alternative texture filter may require a different distribution of mipmap data such that more or (ideally) less data is required from multiple mipmap levels.

Reconstruction quality: An alternative texture filter may be capable of producing higher quality results with more computational complexity and/or a larger footprint (e.g. a cubic filter) or simply a better optimised response.

Anisotropic filtering workload: An alternative texture filter may be able to reduce the computational cost of the anisotropic filter for a given quality requirement.

The examples described herein help to achieve these aims. The texture filtering units described below may be referred to as "Parametric Texture Filters" because they admit intrinsic isotropic and anisotropic level of detail parameters as inputs. The isotropic parameter will interact with the mipmap requirements. The anisotropic parameter will interact with the anisotropic filter requirements. The reconstruction quality depends on the range of supported values. A given parametric texture filter is expected to have a sweet spot such that parameters restricted to that neighbourhood will tend to produce high quality but lower performance whereas a broader range of parameters will ease the burden of the other filtering operations at the expense of quality.

Figure 3:
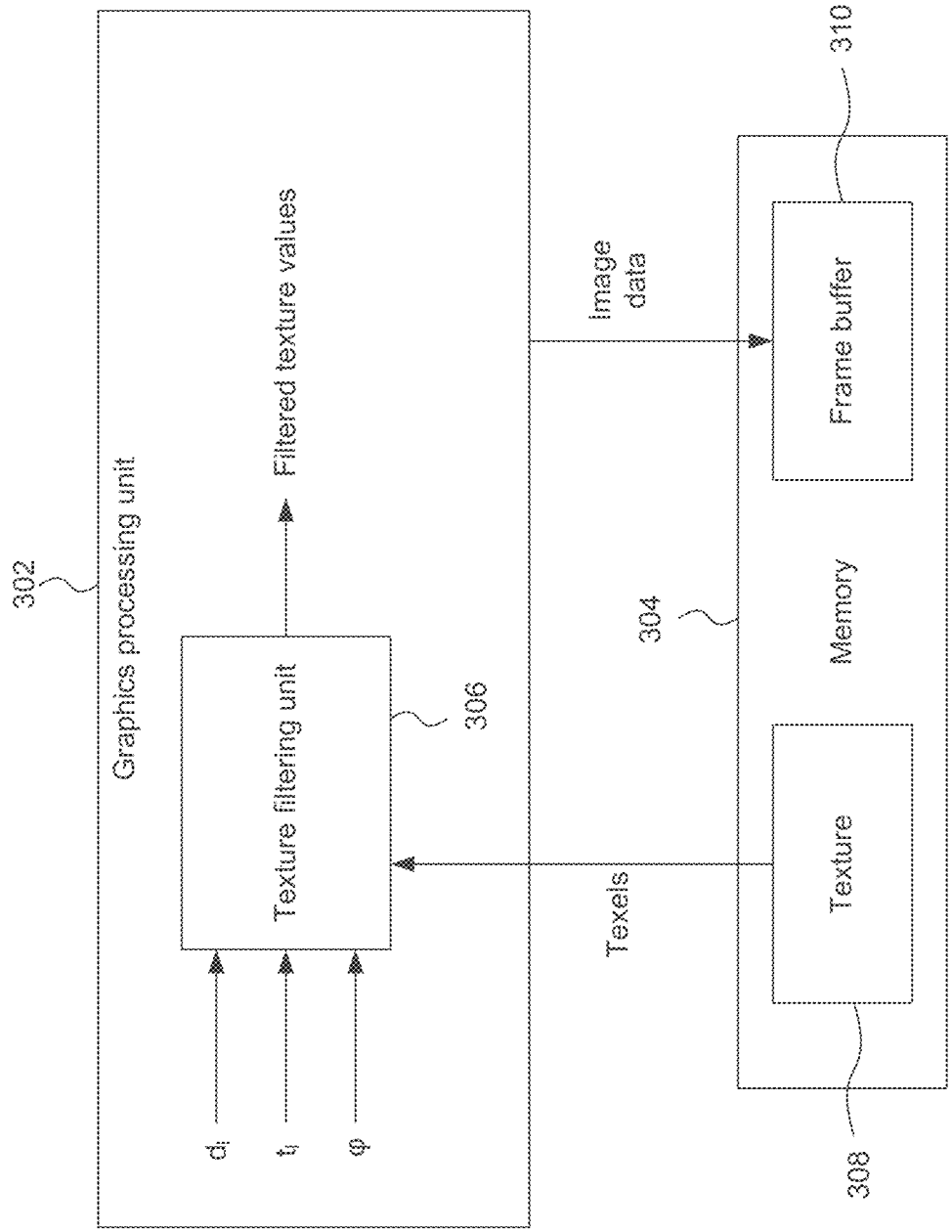
FIG. 3 illustrates a graphics processing system comprising a graphics processing unit which comprises a texture filtering unit as described herein.

FIG. 3 illustrates a graphics processing system. The graphics processing system comprises a graphics processing unit (GPU) 302 and a memory 304. The GPU 302 comprises a texture filtering unit 306. The texture filtering unit 306 is an implementation of a parametric texture filter. The texture filtering unit 306 is arranged to receive three parameters: an input level of detail ($d_I$), an indication of an input amount of anisotropy ($t_I$) and an input direction of anisotropy ($\varphi$). In other examples, the texture filtering unit might not be arranged to receive all three of these parameters, e.g. if the texture filtering unit is not configured to apply anisotropic texture filtering then it might not receive the indication of an input amount of anisotropy ($t_I$) or the input direction of anisotropy ($\varphi$). In general, the texture filtering unit 306 may be implemented in hardware (e.g. fixed function circuitry), software, or a combination thereof, but it may be preferable for it to be implemented in hardware because this tends to provide a lower latency texture filtering operation, at the cost of inflexibility of operation, but since the desired operation of the texture filtering unit 306 is known at design time, its operation does not need to be flexible. The memory 304 comprises a portion of memory 308 for storing a texture (e.g. storing a mipmap representing the texture) and a portion of memory 310 (which may be referred to as a frame buffer) for storing image data (e.g. rendered pixel values) which are output from the GPU 302.

The texture filtering unit 306 has three intrinsic limits: (i) minimum isotropic LOD ($p_{min}^\lambda$), (ii) maximum isotropic LOD ($p_{max}^\lambda$), and (iii) maximum anisotropic LOD ($p_{max}^\mu$). These intrinsic limits depend upon the filter kernel of the texture filtering unit 306 and they define the extent to which the filter can be used to alter the filtering applied to the texture, without needing to determine and blend two differently filtered samples. If the filter kernel of the texture filtering unit 306 is a 2×2 kernel then it can perform bilinear filtering. If the filter kernel is larger than 2×2 then it can perform better filtering than bilinear. For example, a 4×4 filter kernel allows the variance of the filter to be varied within a range defined by maximum and minimum variances, corresponding to the maximum and minimum LODs of the filter ($p_{max}^\lambda$ and $p_{min}^\lambda$). In general, the larger the kernel the greater the range of possible LODs that can be achieved by the parametric filter operating on a single level of the mipmap without needing to interpolate between two differently filtered samples. The larger the kernel the more control the texture filtering unit 306 can have on the way in which it performs texture filtering for a single sample. This control may be used to alter the LOD and/or the anisotropy of the texture filtering. However, the larger the kernel the greater the number of texels that need to be fetched for sampling the texture, so there is a trade-off in setting the size of the kernel. The kernel size may be a fixed parameter of the filter implementation. The intrinsic filter limits ($p_{min}^\lambda$, $p_{max}^\lambda$ and $p_{max}^\mu$) are set to effect a trade-off between filter quality and performance. The parametric filter definition indicates that it can support some maximum degree of filtering.

The texture filtering unit 306 can have many different types of filter kernel in different implementations. There is provided herein a filter-agnostic framework to combine a sequence of filtering operations in a deterministic fashion without having to worry about the exact form of the particular filters being used. To that end, an equivalence class of texture filters is defined such that filter A is equivalent to filter B if and only if they share the same variance (see the Annex below). The filters are non-negative and normalized (i.e. their integral is 1). Texture filtering is then seen as the following chain (ignoring intermediate discretization steps): Mipmap generation filter->Mipmap level reconstruction filter/Parametric texture filter->Mipmap interpolation filter->Anisotropic filter (where the last two stages may be reversed).

The screen space sample distribution has a target resolution, which can be expressed as a target covariance matrix. Because all valid filters belong to the equivalence class, the texture filtering unit 306 can control the filtering such that the covariance of each of the filter stages adds up to the target. A parametric filter (e.g. the texture filtering unit 306)

enables a range of variances to be supported, so this gives us a definitive way to determine how much filtering is performed in subsequent stages (mipmap interpolation or anisotropic filtering) without having to worry about the exact form of the filter kernels. The filter kernel of the texture filtering unit 306 may be an approximation of a Gaussian. A first order approximation to a Gaussian filter is a box filter (nearest-neighbour sampling), and a second order approximation is a tent filter (bilinear sampling).

We now describe a configuration of the texture filtering unit 306. The texture filtering unit's intrinsic limits ($p_{min}^\lambda$, $p_{max}^\lambda$ and $p_{max}^\mu$) are defined in units of LOD in the interval [0,1]. The intrinsic limits $p_{min}^\lambda$, $p_{max}^\lambda$ and $p_{max}^\mu$ may be denoted $p_{min,filter}$, $p_{max,filter}$ and $p_{aniso,filter}$ respectively. These intrinsic limits may be modified by the presence of a sampler bias and sampler limits. For example, the texture filtering unit 306 may support isotropic filtering between 0 and 0.5 (i.e. $p_{min}^\lambda$ and $p_{max}^\lambda$=0.5).

The intrinsic limits of the texture filtering unit 306 take into account the width of the filter kernel used to generate the texture mipmap levels. If a sampler LOD bias is used to compensate for an adjustment in the mipmap kernel width, the default parametric filter limits ($p_{min,filter}'$, $p_{max,filter}'$ and $p_{aniso,filter}'$) are modified such that:

$$\forall x \in [\text{min, max, aniso}] P_{x,filter} = \left\lfloor \frac{1}{2}\log_2\left(1 + 2^{2\beta_{sampler}} \cdot \left(2^{2p'_{x,filter}} - 1\right)\right) \right\rfloor_{U0.8,RTZ}$$

The square brackets in the equation above indicate rounding of exact values to an unsigned U0.8 format, rounding to zero, for the bias adjusted intrinsic filter limits. The sampler may specify the desired interval of isotropic parametric filtering via:

$p_{min,sampler}$=para_smp_min $p_{max,sampler}$=para_smp_min

These sampler-specified limits are then constrained by the adjusted intrinsic limits:

$$\forall x \in [\text{min, max}] p_x = \begin{cases} p_{max,filter} & \text{if } p_{x,sampler} > p_{max,filter} \\ p_{min,filter} & \text{if } p_{x,sampler} < p_{min,filter} \\ p_{x,sampler} & \text{otherwise} \end{cases}$$

These clamped limits are used in subsequent calculations:

para_min=$p_{min}$ para_max=$p_{max}$

The complement in the unit interval of the clamped isotropic limits defines an extrinsic filtering domain, where linear interpolation between adjacent mipmap levels takes place. To compute the interpolation weight, a scaling factor para_scale is output:

$$\text{para\_scale} = \begin{cases} \left\lfloor \dfrac{1}{1 - (p_{max} - p_{min})} \right\rfloor_{F0.4.8,RTZ} & \text{if } p_{min} \neq p_{max} \\ \text{don't care} & \text{otherwise} \end{cases}$$

The square brackets in the equation above indicate rounding of exact values to an unsigned float format with 4 bit exponent and 8 bit mantissa, rounding to zero. Finally, the parametric filter maximum anisotropy is output directly, without any modification from the sampler:

para_aniso=$p_{aniso,filter}$

For a sampler bias $\beta_{sampler}$, ignoring the rounding, the bias adjustment function can be written as:

$$2^{\beta_{sampler}} = \sqrt{\frac{(2^{p_{x,filter}})^2 - 1}{(2^{p'_{x,filter}})^2 - 1}}$$

That is to say, there is some default variance (in units of texels) associated with each mipmap level so that the default parametric filter (relative)

$$LODp_x'^\lambda = \frac{1}{2}\log_2(\text{Var}(p_x) + \text{Var}(mipmap)) + c,$$

where c is determined such that the absolute minimum filter width (both parametric and mipmap) generates a (relative) LOD of zero i.e. exactly on a mipmap level:

$$p_0'^\lambda = 0 \Rightarrow c = -\frac{1}{2}\log_2(\text{Var}(p_0) + \text{Var}(mipmap))$$

The bias then is seen to have the effect of modifying that default variance (e.g. negative bias forces higher resolution mipmap levels to be selected, which implies, if sensible sampling behaviour is being followed, that the kernel used to generate the higher resolution mipmap levels spans more texels, or in other words, each mipmap level appears blurry so a negative bias is used to compensate). The bias adjusted parametric filter (relative) LOD is written in terms of the modified mipmap variance (Var(mipmap')) and the compensating sampler bias ($\beta_{sampler}$):

$$p_x^\lambda = \frac{1}{2}\log_2(\text{Var}(p_x) + \text{Var}(mipmap')) + \beta_{sampler} + c$$

Again, the minimum degree of filtering lies on the mipmap level, so this constrains the relationship between the bias and the mipmap variance such that:

$$p_0^\lambda = 0 \Rightarrow \beta_{sampler} = \frac{1}{2}\log_2\left(\frac{\text{Var}(p_0) + \text{Var}(mipmap)}{\text{Var}(p_0) + \text{Var}(mipmap')}\right)$$

To avoid any explicit reference to the mipmap kernel variance, substitution into the squared bias adjustment function gives:

$$\frac{(2^{p_x^\lambda})^2 - 1}{(2^{p_x'^\lambda})^2 - 1} = \frac{\dfrac{\text{Var}(p_x) + \text{Var}(mipmap)}{\text{Var}(p_0) + \text{Var}(mipmap)} - 1}{\dfrac{\text{Var}(p_x) + \text{Var}(mipmap')}{\text{Var}(p_0) + \text{Var}(mipmap')} - 1} =$$

$$\frac{\text{Var}(p_x) + \text{Var}(mipmap) - \dfrac{(\text{Var}(p_0) + \text{Var}(mipmap))}{\text{Var}(p_x) + \text{Var}(mipmap')} \left(\dfrac{\text{Var}(p_0) + \text{Var}(mipmap)}{\text{Var}(p_0) + \text{Var}(mipmap')}\right)}{(\text{Var}(p_0) + \text{Var}(mipmap))} =$$

-continued $$\left(\frac{\text{Var}(p_0) + \text{Var}(mipmap)}{\text{Var}(p_0) + \text{Var}(mipmap')}\right) = 2^{2\beta_{sampler}}$$

So, a sampler bias is used to compensate for a variation in the width of the filter that is used to generate the mipmap levels, and the parametric filter limits are adjusted accordingly to reflect the modified variance, since as LOD is a logarithmic quantity, it is the relative size of the parametric filter width and the mipmap filter width that is relevant. In other words, the method may include receiving a bias parameter $\beta_{sampler}$ indicating a width of a filter used to generate the images at the mipmap levels of the mipmap, and adjusting the minimum and maximum limits ($p_{min}^\lambda$ and $p_{max}^\lambda$) of the texture filtering unit 306 based on the received bias parameter $\beta_{sampler}$.

Figure 4:
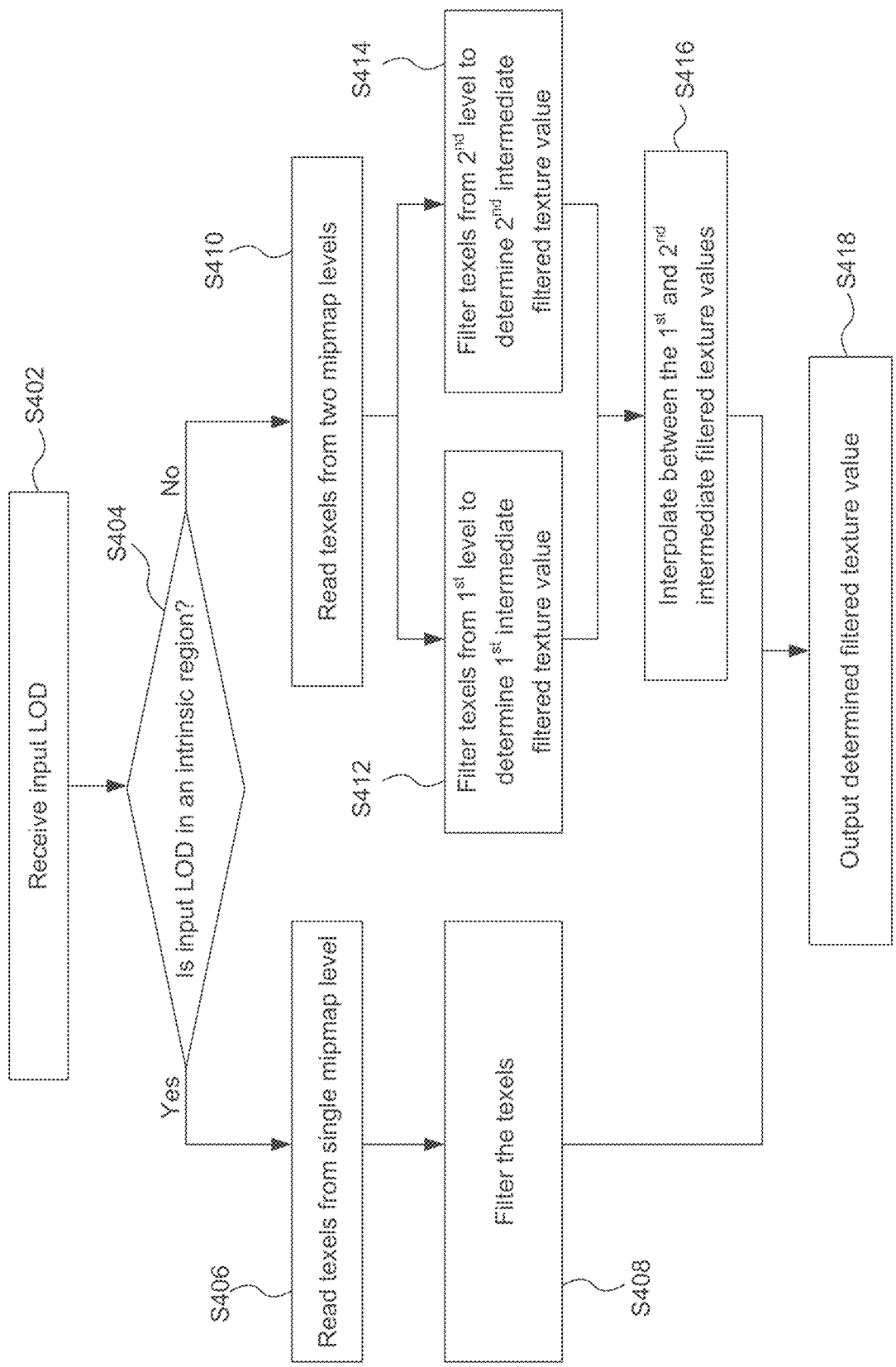
FIG. 4 is a flow chart for a method of applying texture filtering to a texture.

FIG. 4 is a flow chart for a method of applying texture filtering to a texture using the texture filtering unit 306. As described above, the texture is represented with a mipmap comprising a plurality of levels, wherein each level of the mipmap comprises an image representing the texture at a respective level of detail. In step S402 the texture filtering unit 306 receives an input level of detail ($d_I$) for filtering the texture. The texture filtering unit 306 will also receive u and v texture coordinates to indicate a position within the texture at which a filtered texture value is to be determined at the input level of detail.

Figure 5:
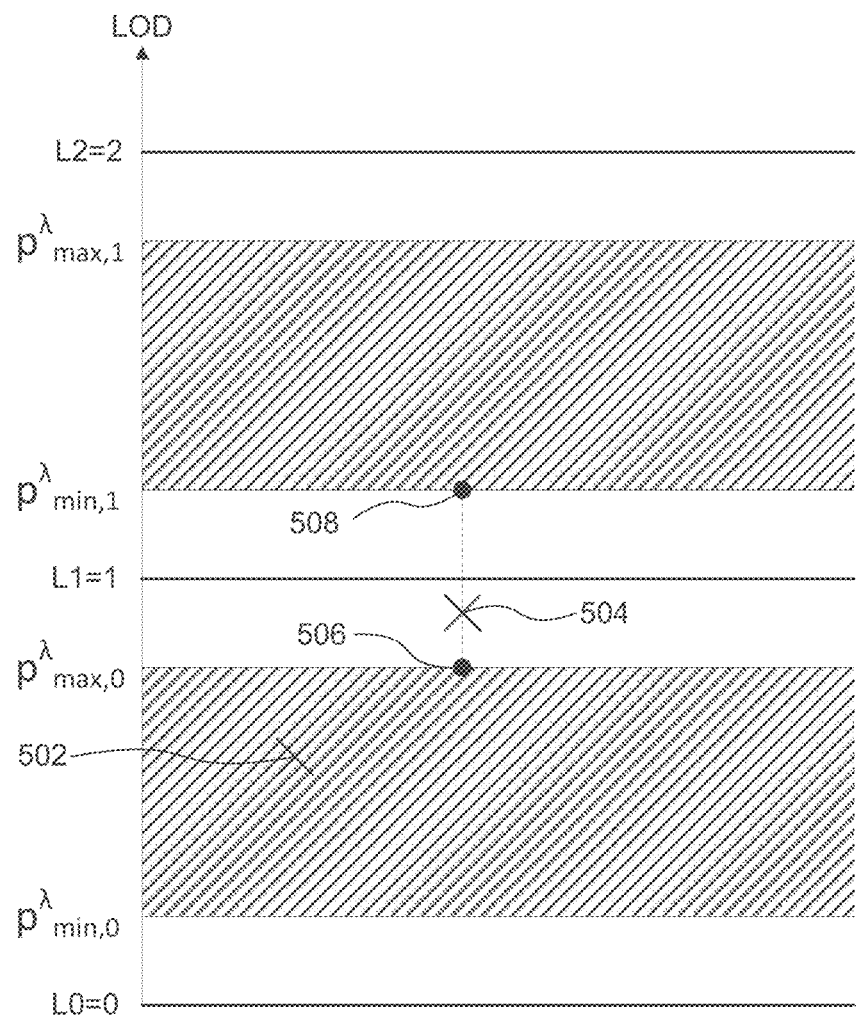
FIG. 5 is a graph showing levels of detail of mipmap levels of a mipmap, and shows intrinsic and extrinsic regions of a texture filtering unit.

FIG. 5 is a graph showing levels of detail of the mipmap levels of the mipmap, indicated "L0", "L1" and "L2". As described above, the texture filtering unit 306 has minimum and maximum limits ($p_{min}^\lambda$ and $p_{max}^\lambda$) on an amount by which it can alter the level of detail when it filters texels from an image of a single level of the mipmap. The range of level of detail between the minimum and maximum limits defines an intrinsic region of the texture filtering unit, and wherein levels of detail outside of the range of level of detail between the minimum and maximum limits define an extrinsic region of the texture filtering unit. For example, a first of the levels (level L0) is associated with a first intrinsic region of the texture filtering unit which corresponds to LOD values between $p_{min,0}^\lambda$ and $p_{max,0}^\lambda$, and a second of the mipmap levels (level L1) is associated with a second intrinsic region of the texture filtering unit which corresponds to LOD values between $p_{min,1}^\lambda$ and $p_{max,1}^\lambda$. LOD values which are not in an intrinsic region are in an extrinsic region. The minimum and maximum LODs are shown as lines above each of the MIP map levels, and the hatched area between $p_{m^Amx}$ and $p_{max,x}^\lambda$ for a particular mipmap level Lx (where x=0 or x=1 in the graph shown in FIG. 5) shows the "intrinsic region" relating to that particular mipmap level, i.e. the LODs for which only that particular mipmap level needs to be fetched. The texture filtering unit has a plurality of intrinsic regions and extrinsic regions, wherein there is an intrinsic region and an extrinsic region for each of a plurality of the mipmap levels of the mipmap.

In step S404 the texture filtering unit 306 determines whether the received input level of detail (di) is in an intrinsic region or an extrinsic region of the texture filtering unit 306, e.g. whether it is in one of the hatched regions shown in Figure (corresponding to an intrinsic region) or one of the unhatched regions shown in FIG. 5 (corresponding to an extrinsic region).

If it is determined in step S404 that the received input level of detail is in an intrinsic region of the texture filtering unit 306 then the method passes to step S406. In step S406 the texture filtering unit 306 reads texels from a single mipmap level of the mipmap, e.g. from the texture memory 308 within the memory 304. Then in step S408 the texture filtering unit 306 filters the read texels from the single mipmap level to determine a filtered texture value representing part of the texture at the input level of detail. The method then passes to step S418 which is described below.

The texture filtering unit 306 performs filtering (e.g. in step S408) in accordance with a filtering function which is non-negative, normalised and has a mean value of zero. In particular, the texture filtering unit 306 is configured to filter texels using a filter kernel, wherein values of the filter kernel can be varied to alter a variance of the filtering performed by the texture filtering unit 306 so as to vary the amount by which the level of detail is altered between the minimum and maximum limits ($p_{min}^\lambda$ and $p_{max}^\lambda$). The values of the filter kernel are set based on the received input level of detail ($d_I$) to control the amount by which it alters the level of detail when it filters the texels. The filter kernel can be represented with a filter matrix. The filter matrix may be a square matrix, or some other type of matrix. To give some examples, the filter matrix may be a 2×2 matrix, a 3×3 matrix or a 4×4 matrix.

For example, if the received input level of detail ($d_I$) is at the LOD indicated as 502 in FIG. 5 then in step S406 texels (e.g. within a 4×4 kernel) are read from mipmap level L0 (not any mipmap levels other than L0, e.g. not from mipmap level L1). The texture filtering unit 306 can adapt its filter kernel so as to filter the read texels to achieve the desired LOD indicated at 502 (provided that the desired variance is supported within the intrinsic limits of the texture filtering unit 306).

As an example, step S404 of determining whether the received input level of detail is in an intrinsic region or an extrinsic region of the texture filtering unit may comprise determining a first indication of a mipmap level, $d_{hi}$, such that $d_{hi}=\lceil d_I-p_{min}^\lambda \rceil$, and determining a second indication of a mipmap level, $d_{lo}$, such that $d_{lo}=\lceil d_I-p_{max}^\lambda \rceil$, where $d_I$ is the received input level of detail, $p_{min}^\lambda$ is the minimum limit and $p_{max}^\lambda$ is the maximum limit. The received input level of detail is in an intrinsic region if $d_{hi}=d_{lo}$, whereas the received input level of detail is in an extrinsic region if $d_{hi} \neq d_{lo}$. It is noted that both the minimum and maximum limits ($p_{min}^\lambda$ and $p_{max}^\lambda$) are greater than or equal to 0 and less than 1. In an example with 8 bits of fractional precision, the maximum value for $p_{max}^\lambda$ $$1 - \frac{1}{256}.$$

Furthermore, in the examples described herein the intrinsic region covers a non-zero range of LOD values, so the minimum limit $p_{min}^\lambda$ is not greater than the maximum limit $p_{max}^\lambda$. Therefore, $0 \leq p_{min}^\lambda \leq p_{max}^\lambda < 1$. With reference to the input LOD 502, it can be seen that $0<d_I-p_{min,0}^\lambda<1$, so $d_{hi}=0$, and it can be seen that $-1<d_I-p_{max,0}^\lambda<0$, so $d_{lo}=0$. Therefore, $d_{hi}=d_{lo}$ so LOD 502 is in the intrinsic region associated with mipmap level L0.

If it is determined in step S404 that the received input level of detail is in an extrinsic region of the texture filtering unit 306 then the method passes to step S410. In step S410 the texture filtering unit 306 reads texels from two mipmap levels of the mipmap, e.g. from the texture memory 308 within the memory 304. The texture filtering unit 306 processes the read texels from the two mipmap levels (in steps S412, S414 and S416) to determine a filtered texture value representing part of the texture at the input level of detail.

In particular, the method passes from step S410 to step S412 and to S414. In step S412 the texture filtering unit 306 filters the read texels from a first of the two mipmap levels to determine a first intermediate filtered texture value. The first of the two mipmap levels is associated with a first intrinsic region of the texture filtering unit 306. The first intermediate filtered texture value is determined in step S412 at a first intermediate level of detail 506 within the first intrinsic region of the texture filtering unit.

In step S414 the texture filtering unit 306 filters the read texels from a second of the two mipmap levels to determine a second intermediate filtered texture value. The second of the two mipmap levels is associated with a second intrinsic region of the texture filtering unit 306. The second intermediate filtered texture value is determined in step S414 at a second intermediate level of detail 508 within the second intrinsic region of the texture filtering unit.

In step S416 the texture filtering unit 306 determines a filtered texture value representing part of the texture at the input level of detail by using the input level of detail to interpolate between the first intermediate filtered texture value at the first intermediate level of detail 506 (determined in step S412) and the second intermediate filtered texture value at the second intermediate level of detail 508 (determined in step S414). The method then passes to step S418 which is described below.

With reference to the input LOD 504 shown in FIG. 5, it can be seen that $0 < d_I - p_{min,0}^\lambda < 1$, so $d_{hi} = 0$, and it can be seen that $0 < d_I - p_{max,0}^\lambda < 1$, so $d_{lo} = 1$. Therefore, $d_{hi} \neq d_{lo}$ so LOD 504 is in the extrinsic region between the intrinsic regions associated with mipmap levels L0 and L1.

In some examples, a parameter $p_{lo}^\lambda$ may be determined to indicate the amount by which the LOD is altered for the mipmap level indicated by $d_{lo}$, and a parameter $p_{hi}^\lambda$ may be determined to indicate the amount by which the LOD is altered for the mipmap level indicated by $d_{hi}$. If it is determined that the received input level of detail is in an intrinsic region of the texture filtering unit 306 (e.g. for input LOD 502), then $d_{hi} = d_{lo}$, so a single parameter $p^\lambda$ may be determined where $p_{hi}^\lambda = p_{lo}^\lambda = p^\lambda$. In this case texels are read from the single mipmap level of the mipmap indicated by $d_{hi}$ and $d_{lo}$, and the parameter $p^\lambda$ is set to determine the amount by which the level of detail is altered from the single mipmap level with the texture filtering unit, wherein $p^\lambda = d_I - d_{hi} = d_I - d_{lo}$.

If it is determined that the received input level of detail is in an extrinsic region of the texture filtering unit 306 (e.g. for input LOD 504), then $d_{hi} \neq d_{lo}$, so two parameters $p_{hi}^\lambda$ and $p_{lo}^\lambda$ are determined where $p_{hi}^\lambda \neq p_{lo}^\lambda$. In this case texels are read from the two mipmap levels of the mipmap indicated by $p_{hi}$ and $d_{lo}$. The parameter $p_{hi}^\lambda$ is set to determine the amount by which the level of detail is altered from a first of the two mipmap levels indicated by $d_h$, with the texture filtering unit 306. The parameter $p_{lo}^\lambda$ is set to determine the amount by which the level of detail is altered from a second of the two mipmap levels indicated by $d_{lo}$ with the texture filtering unit 306. For example, $p_{hi}^\lambda = p_{max}^\lambda$ and $p_{lo}^\lambda = p_{min}^\lambda$. In this example, the first intermediate level of detail 506 (at a level of detail corresponding to $p_{max,0}$) and the second intermediate level of detail 508 (at a level of detail corresponding to $p_{min,1}^\lambda$) can be considered to be "virtual mipmap levels" such that interpolation can occur between the virtual mipmap levels to determine a filtered texture value at a desired input level of detail in the extrinsic region (e.g. a LOD 504).

Using the virtual mipmap level at $p_{min,1}^\lambda$ rather than the actual mipmap level L1 in the interpolation may improve the quality of reconstruction, especially when taking image compression into account.

When the input level of detail is in an extrinsic region of the texture filtering unit 306, an interpolation factor $\delta$ is set for interpolating between the first intermediate filtered texture value at the first intermediate level of detail 506 and the second intermediate filtered texture value at the second intermediate level of detail 508. The first intermediate level of detail 506 is given by $d_{hi} + p_{hi}^\lambda$ and the second intermediate level of detail 508 is given by $d_{lo} + p_{lo}^\lambda$, and the interpolation factor $\delta$ is given by $$\delta = \frac{d_l - p_{max}^\lambda - d_{hi}}{1 - (p_{max}^\lambda - p_{min}^\lambda)}.$$

If the input level of detail is in an intrinsic region of the texture filtering unit 306, then no interpolation is performed, and the interpolation factor $\delta$ may be set to zero. Note that the quantity S may be calculated by multiplying the simple expression $d_l - p_{max}^\lambda - d_{hi}$ by the scaling factor para_scale defined above.

So in summary of some of the above description:

$$d_{hi} = \lfloor d_l - p_{min}^\lambda \rfloor$$
$$d_{lo} = \lceil d_l - p_{max}^\lambda \rceil$$
$$\delta = \begin{cases} 0 & d_{hi} = d_{lo} \\ \dfrac{d_l - p_{max}^\lambda - d_{hi}}{1 - (p_{max}^\lambda - p_{min}^\lambda)} & \text{otherwise} \end{cases}$$

The LOD parameters $p_{hi}^\lambda$ and $p_{lo}^\lambda$ are used to determine how much isotropic filtering, in terms of additional level-of-detail, the parametric filter (i.e. the texture filtering unit 306) separately applies to image levels $d_{hi}$ and $d_{lo}$ respectively, where:

$$p = \begin{cases} d_l - d_{hi} & d_{hi} = d_{lo} \\ p_{max}^\lambda & \text{otherwise} \end{cases}$$

$$p = \begin{cases} d_l - d_{lo} & d_{hi} = d_{lo} \\ p_{min}^\lambda & \text{otherwise} \end{cases}$$

In conjunction with $p_{hi}^\lambda$ and $p_{lo}^\lambda$, the parametric filter isotropic logarithmic kernel widths $p_{hi}^\lambda$ and $p_{lo}^\lambda$ may be given in units of (log 2) texels, as:

$$\omega_{hi}^\lambda = \frac{1}{2}\log_2\left(1 - 2^{-2p_{hi}^\lambda}\right) - \text{sampler.bias}$$

$$\omega_{lo}^\lambda = \frac{1}{2}\log_2\left(1 - 2^{-2p_{lo}^\lambda}\right) - \text{sampler.bias}$$

So there are two ways to parameterise the texture filtering unit 306, either with an LOD value (which is useful if for example a couple of discrete kernel widths are generated and then interpolation is performed between two intermediate filtered values) or with the kernel width itself (e.g. if the texture filtering unit 306 is implemented as a multi-tap bilinear filter where samples are spaced at some specific distance apart to deliver a particular variance). The sampler bias, which is denoted "sampler.bias" in the equations above, may also be denoted as $\beta_{sampler}$. The preceding two equations may be rearranged as:

$$2^{\omega_{hi}^\lambda} = \frac{2^{-\beta_{sampler}}\sqrt{\left(2^{p_{hi}^\lambda}\right)^2 - 1}}{2^{p_{hi}^\lambda}}$$

$$2^{\omega_{lo}^\lambda} = \frac{2^{-\beta_{sampler}}\sqrt{\left(2^{p_{lo}^\lambda}\right)^2 - 1}}{2^{p_{lo}^\lambda}}$$

The expression under the radical in the two preceding equations signifies the difference in variance between the target LOD and the minimal filtered LOD (e.g. sampling directly from a mipmap level).

Calculating filtered texture values in the intrinsic region (e.g. for LOD 502) by reading in texels from a single mipmap level (e.g. from level L0 but not from level L1) may result in a bandwidth reduction (e.g. a 15-20% reduction in bandwidth). For example, a bandwidth reduction can be achieved if the levels L0 and L1 are stored in separate locations in a memory, such that they are not included in the same cache line. The caching performance will depend on re-use due to the increasing granularity of data reads as you ascend the cache hierarchy. For example, every texel read could imply that an e.g. 8×8 block of texels is cached at some level in the hierarchy. If a texture is being minified, specifically so that the LOD is some fractional value between adjacent mipmap levels, a higher density of texel bandwidth is implied. On the other hand, by only reading texels from a single mipmap level, no data is required from the lower resolution map at all, at least until the extrinsic interval is hit. Mipmapping bounds the bandwidth by preventing mipmap levels from being read after the minification has increased beyond a certain point (2× for linear, sqrt(2) for nearest neighbour). Reading an additional mipmap level in the extrinsic regions will increase the bandwidth but will allow smooth transitions between levels of detail. By deferring the point at which a secondary mipmap level is read, we can reduce this additional bandwidth cost, but this results in some additional throughput to handle the increased filtering requirement on the higher detail mipmap level.

Another benefit of using the parametric filtering technique described herein is an improvement in quality. In contrast to trilinear filtering, when the desired LOD is within the "intrinsic filter range" (i.e. the hatched range of LODs shown in FIG. 5), the texture filtering unit 306 does not blend filtered values from two separate mipmap levels. Furthermore, the resolution is reduced from that of the $d_{hi}$ mipmap level (e.g. level L0) by the amount needed to get to the desired LOD, rather than in trilinear filtering where we are using samples from levels $d_{hi}$ and $d_{lo}$ (e.g. levels L0 and L1) wherein the samples from the $d_{lo}$ mipmap level (e.g. level L1) have a lower resolution than the desired LOD.

It may be possible to make the intrinsic region (i.e. the hatched region shown in FIG. 5) extend across the entire range of LODs, but this could cause discontinuities where the texture filtering unit 306 crosses over mipmap level LODs. So, in the examples described herein, extrinsic regions are implemented (i.e. there are gaps between the intrinsic regions in LOD space), in which interpolation can be applied between virtual mipmap levels. The interpolation in the extrinsic region may for example be linear interpolation, but other interpolation functions may be used such as cubic interpolation. A different interpolation function may be used depending on the $\delta$ parameter defined above. For example, the sample 504 shown in FIG. 5 cannot be determined from only one mipmap level because it is outside of the intrinsic limits of the texture filter, i.e. its LOD is above $p_{max,0}{}^\lambda$ and below $p_{min,1}{}^\lambda$. Similarly to trilinear filtering between mipmap levels, values can be determined at the correct spatial positions in the texture space (as indicated by the u and v parameters) at the LODs of $p_{max,0}{}^\lambda$ and $p_{min,1}{}^\lambda$ which represent the virtual mip map levels (as indicated by 506 and 508 in FIG. 5), and then these two values can be blended (e.g. linearly interpolated) to give the sampled texture value at LOD 504. The filtering applied to generate the values at the virtual mipmap levels can be better quality filtering than that applied to generate the mipmap levels (which is generally box filtering).

The texture filtering unit 306 operates as a parametric texture filter with the limits $p_{max}{}^\lambda$ and $p_{min}{}^\lambda$ which define one or more intrinsic ranges of LODs within which samples can be generated from texel values from a single level of the mip map, wherein a desired LOD is provided as a parameter to the filter. The texture filtering unit 306 determines whether the desired LOD falls within an intrinsic range and if so then it applies filtering to the texel values from one single mipmap level, whereas if the desired LOD falls outside of the intrinsic range(s) then it uses texels from two of the mipmap levels.

In step S418 the texture filtering unit 306 outputs the determined filtered texture value (which may have been determined in step S408 or in step S416). As shown in FIG. 3 the filtered texture values can be output from the texture filtering unit 306 for further processing in the graphics processing unit 302. For example, the determined filtered texture values that are output from the texture filtering unit 306 may be used in the graphics processing unit 302 for rendering an image of a scene in which the texture is applied to a surface in the scene. Alternatively, the filtered texture values may be output from the graphics processing unit 302 (e.g. and passed to the memory 304 for storage therein) without being further processed by the graphics processing unit 302.

In addition, or as an alternative, to altering the LOD of texels as described above, the texture filtering unit 306 can reshape its filtering function represented by its filter kernel so that the variance is stretched along a direction in accordance with the input direction of anisotropy φ. In some examples, the direction in which the variance of the filter kernel is stretched matches the input direction of anisotropy φ. In other words, the filter kernel is configured to apply anisotropic filtering in the input direction of anisotropy. However, in other examples, the direction in which the variance of the filter kernel is stretched does not have to be exactly along the direction φ, but the effect of the stretching is elongation of the filtering function in a direction that is approximately aligned with the input direction of anisotropy φ.

Figure 6:
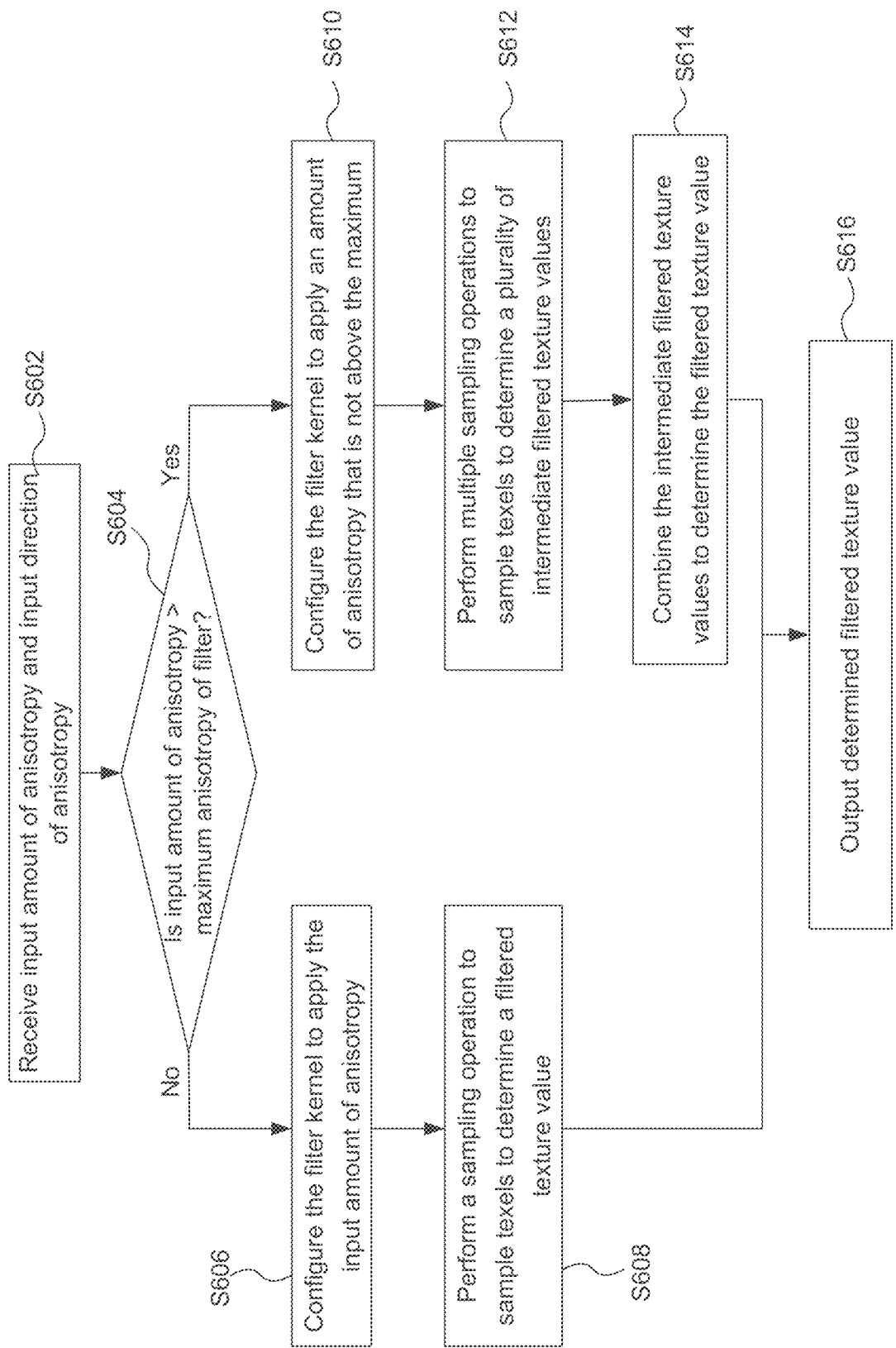
FIG. 6 is a flow chart for a method of applying anisotropic texture filtering to a texture.

FIG. 6 is a flow chart for a method of applying anisotropic texture filtering to a texture using the texture filtering unit 306. The texture filtering unit 306 is configured to apply anisotropic filtering using a filter kernel which can be adapted to apply different amounts of anisotropy up to a maximum amount of anisotropy, which is indicated by the maximum anisotropic LOD of the texture filtering unit ($p_{max}{}^\mu$). The texture filtering unit 306 can only reshape its filtering function within some intrinsic limits which are dependent upon the size of its filter kernel. For example, a larger kernel (i.e. which uses a larger number of texels) has more scope for elongating its filtering footprint than a smaller kernel. In step S602 the texture filtering unit 306 receives an input amount of anisotropy ($t_I$) and an input direction of anisotropy φ for filtering the texture. The texture filtering unit 306 will also receive u and v texture coordinates to indicate a position within the texture at which a filtered texture value is to be determined at the input level of detail. The texture filtering unit 306 may also receive an input level of detail ($d_I$) as described above with reference to step S402 of FIG. 4.

In step S604 the texture filtering unit 306 determines whether the input amount of anisotropy ($t_I$) is above the maximum amount of anisotropy ($p_{max}^H$). For example, the texture filtering unit 306 may be able to apply a filtering function which has an anisotropic ratio η somewhere between 1 and 2 (where η=1 is isotropic filtering).

Figure 7A:
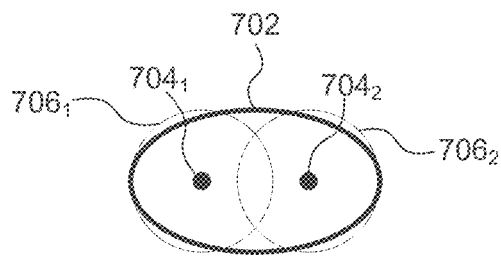
FIG. 7a illustrates how two isotropic samples can be combined to form a first anisotropic footprint.
Figure 7B:
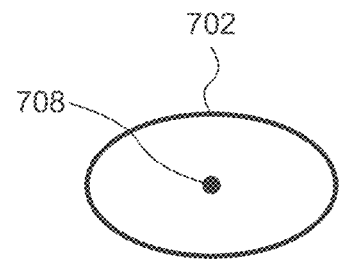
FIG. 7b illustrates a single anisotropic sample forming the first anisotropic footprint.

FIG. 7a shows an example of a desired anisotropic footprint 702 as an ellipse which has an anisotropic ratio of 2. In conventional texture filtering systems, anisotropic filtering may be achieved by combining isotropic sample values, e.g. the anisotropic filter footprint 702 can be represented by combining two isotropic samples taken at the positions shown with the black circles $704_1$ and $704_2$, having circular footprints $706_1$ and $706_2$ with a radius equal to the length of the minor axis of the ellipse 702. In this example, the anisotropic ratio is 2, which does not exceed the intrinsic limit of the texture filtering unit 306. FIG. 7b shows that a single sample 708 taken with the texture filtering unit 306 can have an elliptical footprint 702 which matches the desired elliptical footprint. In this case, the input amount of anisotropy is not greater than the maximum anisotropy of the texture filtering unit 306 so the method passes from step S604 to step S606.

In step S606 the texture filtering unit 306 configures the filter kernel to apply the input amount of anisotropy. Then in step S608 the texture filtering unit 306 performs a sampling operation to sample texels of the texture using the filter kernel to determine a filtered texture value which has been filtered in accordance with the input amount of anisotropy and the input direction of anisotropy. The method passes from step S608 to step S616 which is described below.

Figure 7C:
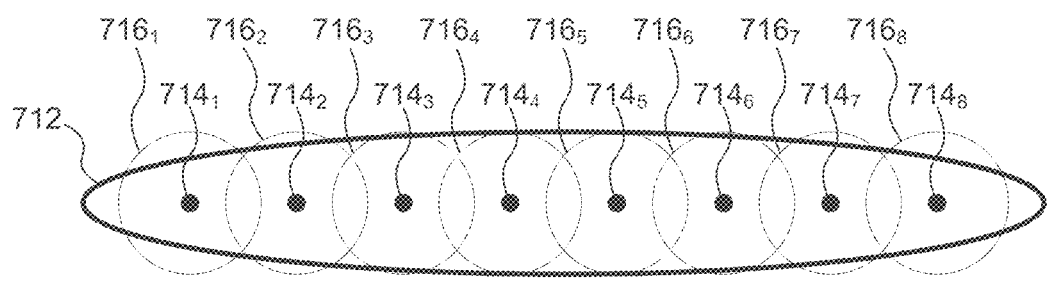
FIG. 7c illustrates how eight isotropic samples can be combined to form a second anisotropic footprint.
Figure 7D:
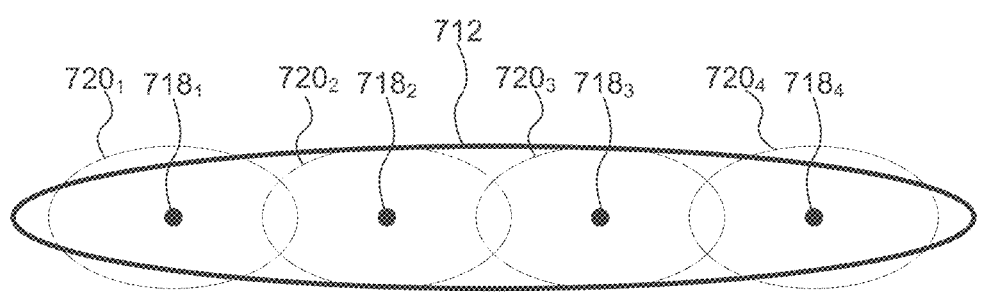
FIG. 7d illustrates an example in which four anisotropic samples form the second anisotropic footprint.

Due to the finite size of the filter kernel of the texture filtering unit 306 (i.e. due to the fact that the filter kernel only has values for a small region of the texture) there is a limit to the amount of anisotropy that the filter can introduce into the footprint of a single sample. FIG. 7c shows a desired anisotropic footprint 712 which has a higher anisotropic ratio. In particular, the anisotropic ratio of the footprint 712 is larger than the maximum amount of anisotropy that can be introduced intrinsically by the texture filtering unit 306. For example, the anisotropic ratio of the footprint 712 may be 8, and the maximum anisotropic ratio that the texture filtering unit 306 can apply may be 2. FIG. 7c shows how a conventional filter could represent the footprint 712 by combining 8 isotropic samples, e.g. at sample positions $714_1$ to $714_8$ with respective circular footprints $716_1$ to $716_8$. In contrast FIG. 7d shows the anisotropic samples at sample positions $718_1$ to $718_4$ with respective elliptical footprints $720_1$ to $720_4$ generated by the texture filtering unit 306 which can be combined to represent the footprint 712. In this case, the input amount of anisotropy is greater than the maximum anisotropy of the texture filtering unit 306 so the method passes from step S604 to step S610.

In step S610 the texture filtering unit 306 configures the filter kernel to apply an amount of anisotropy that is not above the maximum amount of anisotropy. For example, the filter kernel may be configured to apply an amount of anisotropy that is equal to the maximum amount of anisotropy.

In step S612 the texture filtering unit 306 performs a plurality of sampling operations to sample texels of the texture using the filter kernel to determine a respective plurality of intermediate filtered texture values (e.g. at sample positions $718_1$ to $718_4$). The plurality of sampling operations sample respective subsets of texels of the texture, wherein the respective subsets of texels are displaced with respect to each other in the texture space of the texture in accordance with the input direction of anisotropy (φ).

In step S614 the texture filtering unit 306 combines the plurality of intermediate filtered texture values (that were determined in step S612) to determine a filtered texture value which has been filtered in accordance with the input amount of anisotropy and the input direction of anisotropy. For example, the plurality of intermediate filtered texture values can be combined by performing a weighted sum of the intermediate filtered texture values. As an example, the weights of the weighted sum are non-negative and represent a normalised filtering function. The filtering function may also have a mean value of zero. The normalised filtering function can be any suitable shape, such as a Gaussian filtering function, a tent filtering function, a box filtering function, or some other filtering function which is non-negative and normalised.

It can be seen by comparing FIGS. 7c and 7d that fewer samples (e.g. half the number of samples in this example) are determined using the texture filtering unit 306 compared to the conventional approach shown in FIG. 7c. Having fewer samples may improve the quality of the filtered texture values and/or it may reduce the amount of processing that needs to be performed by the texture filtering unit 306 such that the processing latency, power consumption and/or silicon area of the texture filtering unit 306 can be reduced. Furthermore, being able to vary the amount of anisotropy that is provided intrinsically by the texture filtering unit 306 allows the texture filtering unit 306 to be very flexible in its approach to performing anisotropic texture filtering. The texture filtering unit 306 may be implemented in hardware (e.g. dedicated hardware such as fixed function circuitry), which is generally more efficient than a software implementation (in terms of processing latency and power consumption). Hardware implementations are generally less flexible in their operation compared to software implementations. However, the texture filtering unit 306 described herein operates as a parametric texture filter which receives parameters (e.g. an input LOD ($d_I$), an input amount of anisotropy ($t_I$) and/or an input direction of anisotropy (φ)) which can control the filtering that is performed by the texture filtering unit 306. It can do this by varying the filter kernel of the texture filtering unit 306 to control the amount by which the LOD is altered and/or to control the amount and/or direction of anisotropy that is applied when the texture filtering unit 306 filters texels to determine filtered texture values.

It can be seen from the description above that the filter kernel of the texture filtering unit 306 can be adapted to apply different amounts of anisotropy between a minimum amount of anisotropy and the maximum amount of anisotropy. The minimum amount of anisotropy may correspond to an anisotropic ratio of 1 (i.e. to isotropic filtering). In the examples shown in FIGS. 7b and 7d the maximum amount of anisotropy corresponds to an anisotropic ratio of 2, but in other examples, the maximum amount of anisotropy may correspond to different anisotropic ratios. As described above, the filter kernel can be represented with a filter matrix. The filter matrix may be a square matrix, or some other type of matrix. To give some examples, the filter matrix may be a 2×2 matrix, a 3×3 matrix or a 4×4 matrix.

The method passes from step S614 to step S616. In step S616 the texture filtering unit 306 outputs the determined filtered texture value (which may have been determined in step S608 or in step S614). As shown in FIG. 3 the filtered texture values can be output from the texture filtering unit 306 for further processing in the graphics processing unit 302. For example, the determined filtered texture values that are output from the texture filtering unit 306 may be used in the graphics processing unit 302 for rendering an image of a scene in which the texture is applied to a surface in the scene. Alternatively, the filtered texture values may be output from the graphics processing unit 302 (e.g. and passed to the memory 304 for storage therein) without being further processed by the graphics processing unit 302.

The two methods described above with reference to the flow charts of FIG. 4 (in which the texture filtering unit 306 can vary the LOD) and FIG. 6 (in which the texture filtering unit 306 can vary the anisotropy) could be implemented separated or they could be combined. If they are combined then the maximum amount of anisotropy that the filter kernel can apply may depend upon the amount by which the level of detail is altered when the texture filtering unit uses the filter kernel to filter texels. For example, an increase in the amount by which the level of detail is altered may lead to a decrease in the maximum amount of anisotropy that the filter kernel can apply. This is because the finite size of the filter kernel means that the shape and size of the filtering function applied by the filter kernel is limited, such that if the overall variance is isotropically increased (causing an increase in the amount by which the level of detail is altered by the filter) then there is less scope for stretching the variance in one direction to introduce anisotropy into the filtering.

Configuring the filter kernel (in step S606 or in step S610) to apply an amount of anisotropy may involve determining a first anisotropic filtering indication $\mu_{hi}$ and determining a second anisotropic filtering indication $\mu_{lo}$. If it is determined that the received input level of detail is in an intrinsic region of the texture filtering unit 306 then $\mu_{hi}=t_l-d_{hi}$, whereas if it is determined that the received input level of detail is in an extrinsic region of the texture filtering unit 306 then $\mu_{hi}=t_l-(d_l-p_{max}^\lambda)$. Similarly, if it is determined that the received input level of detail is in an intrinsic region of the texture filtering unit 306 then $\mu_{lo}=t_l-d_{lo}$, whereas if it is determined that the received input level of detail is in an extrinsic region of the texture filtering unit 306 then $\mu_{lo}=t_l-(d_l-p_{min}^\lambda)$. Then a first anisotropic filtering parameter $p_{hi}^\mu$ is set to determine how much anisotropic filtering, in terms of additional level of detail, the texture filtering unit is to apply to the texels read from the mipmap level indicated by $d_{hi}$, and a second anisotropic filtering parameter $p_{lo}^\mu$ is set to determine how much anisotropic filtering, in terms of additional level of detail, the texture filtering unit is to apply to the texels read from the mipmap level indicated by $d_{lo}$. If $\mu_{hi} \leq \max(p_{hi}^\lambda, p_{max}^\lambda)$ then $p_{hi}^\mu=\mu_{hi}$, otherwise $p_{hi}^\mu=\max(p_{hi}^\lambda, p_{max}^\mu)$. Similarly, if $\mu_{lo} \leq \max(p_{lo}^\lambda, p_{max}^\mu)$ then $p_{lo}^\mu=\mu_{lo}$, otherwise $p_{lo}^\mu=\max(p_{lo}^\lambda, p_{max}^\mu)$.

So in summary of some of the above description: the anisotropic filter parameters $\mu_{hi}$, and $\mu_{lo}$ determine separate anisotropic levels of details relative to the image levels $d_{hi}$ and $d_{lo}$ respectively, according to:

$$\mu_{hi} = \begin{cases} t_l - d_{hi} & d_{hi} = d_{lo} \text{ or anisoMode is ASYMMETRIC} \\ t_l - (d_l - p_{max}^\lambda) & \text{otherwise} \end{cases}$$

-continued $$\mu_{lo} = \begin{cases} t_l - d_{lo} & d_{hi} = d_{lo} \text{ or anisoMode is ASYMMETRIC} \\ t_l - (d_l - p_{min}^\lambda) & \text{otherwise} \end{cases}$$

The parametric filter anisotropic LOD parameters $p_{hi}^\mu$ and $p_{lo}^\mu$ are used to determine how much anisotropic filtering, in terms of additional level-of-detail, the texture filtering unit 306 is to separately apply to image levels $d_{hi}$ and $d_{lo}$ respectively, according to:

$$p_{hi}^\mu = \begin{cases} \mu_{hi} & \mu_{hi} \leq \max(p_{hi}^\lambda, p_{max}^\mu) \\ \max(p_{hi}^\lambda, p_{max}^\mu) & \text{otherwise} \end{cases}$$

$$p_{lo}^\mu = \begin{cases} \mu_{lo} & \mu_{lo} \leq \max(p_{lo}^\lambda, p_{max}^\mu) \\ \max(p_{lo}^\lambda, p_{max}^\mu) & \text{otherwise} \end{cases}$$

In conjunction with $p_{hi}^\mu$ and $p_{lo}^\mu$, the anisotropic (logarithmic) kernel widths $\omega_{hi}^\mu$ and $\omega_{lo}^\mu$ of the texture filtering unit 306, given in units of (log 2) texels, can be computed, according to:

$$\omega_{hi}^\mu = \frac{1}{2}\log_2(1 - 2^{-2\mu_{hi}}) - \text{sampler.bias}$$

$$\omega_{lo}^\mu = \frac{1}{2}\log_2(1 - 2^{-2\mu_{lo}}) - \text{sampler.bias}$$

The anisotropic filter (logarithmic) anisotropic ratios $\alpha_{hi}$ and $\alpha_{lo}$ can be used to determine how much anisotropic filtering, in terms of then number of discrete samples and associated weights, the anisotropic filter is to separately apply to image levels $d_{hi}$ and $d_{lo}$ respectively as:

$$\alpha_{hi} = \begin{cases} 0 & \mu_{hi} \leq \max(p_{hi}^\lambda, p_{max}^\mu) \\ \mu_{hi} - \max(p_{hi}^\lambda, p_{max}^\mu) & \text{otherwise} \end{cases}$$

$$\alpha_{lo} = \begin{cases} 0 & \mu_{lo} \leq \max(p_{lo}^\lambda, p_{max}^\mu) \\ \mu_{lo} - \max(p_{lo}^\lambda, p_{max}^\mu) & \text{otherwise} \end{cases}$$

In conjunction with $\alpha_{hi}$ and $\alpha_{lo}$, the anisotropic filter (logarithmic) kernel widths $\omega_{hi}$ and $\omega_{lo}$, given in units of (log 2) texels, can be computed, according to:

$$\omega_{hi} = \frac{1}{2}\log_2(1 - 2^{-2\alpha_{hi}}) + \max(p_{hi}^\lambda, p_{max}^\mu) - \text{sampler.bias}$$

$$\omega_{lo} = \frac{1}{2}\log_2(1 - 2^{-2\alpha_{lo}}) + \max(p_{lo}^\lambda, p_{max}^\mu) - \text{sampler.bias}$$

It is noted that ti is an anisotropic analogue to di for the isotropic LOD. The definition of $\mu_{hi}$ and $\mu_{lo}$ depends on how the implementation approaches constructing an anisotropic filter. An asymmetric mode tries to target the absolute variance of the major axis on both mipmap levels. Since the higher resolution mipmap level has a smaller effective minor axis, this implies that the composite kernel shape is more eccentric on the more detailed map, and less eccentric on the lower detailed map, as seen from the expression where $d_{lo}$ is a higher value than $d_{hi}$. This has a couple of issues where the desired "major axis" variance can be smaller than the "minor axis" variance on the lower detailed map. Alternatively, a symmetric mode targets the same eccentricity on both the higher and lower detail mipmap levels and then the results are interpolated to approximate the intermediate kernel. If the texture filtering unit 306 is in the intrinsic filter domain (i.e. it is operating in an intrinsic region), the filter kernel is defined with respect to the base mipmap level to allow consistent filter widths for the minor and major portions of the parametric filter. In the extrinsic domain, the major LOD can then be adjusted to preserve the anisotropic ratio and lean upon the interpolation to approximate the true major axis variance. If the isotropic filtering portion of the texture filtering unit 306 is disabled (or the limits are equal) $\mu_{hi}=\mu_{lo}$ for the symmetric filter, otherwise different filtering parameters are used for filtering each mipmap level, which is because the effective maximum anisotropic ratio that the texture filtering unit 306 can support diminishes as it climbs up the intrinsic filter domain.

With μ, the texture filtering unit 306 knows the degree of anisotropic filtering that is desired, and it then determines how much of that filtering is to be achieved intrinsically by the filter kernel of the texture filtering unit, and how much is to be achieved by combining samples. If the isotropic limits exceed the anisotropic limits, then those anisotropic limits are used, as both the major and minor axis filtering are at least as large as the minor axis. Otherwise the anisotropic limit is used to determine a maximum degree of major axis filtering and if this value is exceeded, the general anisotropic filter is invoked to combine multiple samples. Observe that the kernel widths of the anisotropic portion of the parametric filter have an identical form to the isotropic portion.

When determining how to combine multiple samples for anisotropic filtering the amount of filtering performed by the filter kernel is subtracted (in log space) from the desired amount of anisotropic filtering to determine the remaining amount of anisotropic filtering that is to be handled by combining samples. The form of the anisotropic filter kernel width is similar to that of the parametric filter (which is a direct result of the variance algebra formulation), but as the anisotropic filter is also expressed in terms of texels (i.e. relative to the base mipmap level), an additional scaling by the width of the parametric filter is performed. That is to say, if the parametric filter spans 2 texels, and the anisotropic filter ordinarily takes samples every texel width, it now takes samples every 2 texels instead (as shown in FIG. 7d). This is quite a simple scenario for the usual low quality box filter—in general the adjacent parametric filter kernels may be overlapped by the anisotropic filter to deliver higher quality results, perhaps at the expense of a greater number of samples for a particular anisotropic ratio.

The texture filtering unit 306 can provide an implementation of a parametric texture filter with a range of anisotropic ratios within which the filter can vary the shape of its footprint to represent the anisotropic ratio, wherein an indication of a desired anisotropic ratio is provided as a parameter to the filter, and wherein the texture filtering unit 306 determines whether the desired anisotropic ratio falls within the intrinsic range and if so then it applies filtering to the texel values using the intrinsic ability of the filter to apply the anisotropy, whereas if the desired anisotropic ratio falls outside of the intrinsic range of the filter then it takes multiple samples with the filter (e.g. with the anisotropic ratio set to its maximum allowed value) at different positions along a line, and combines the multiple samples to generate the anisotropically filtered texture value.

Figure 8:
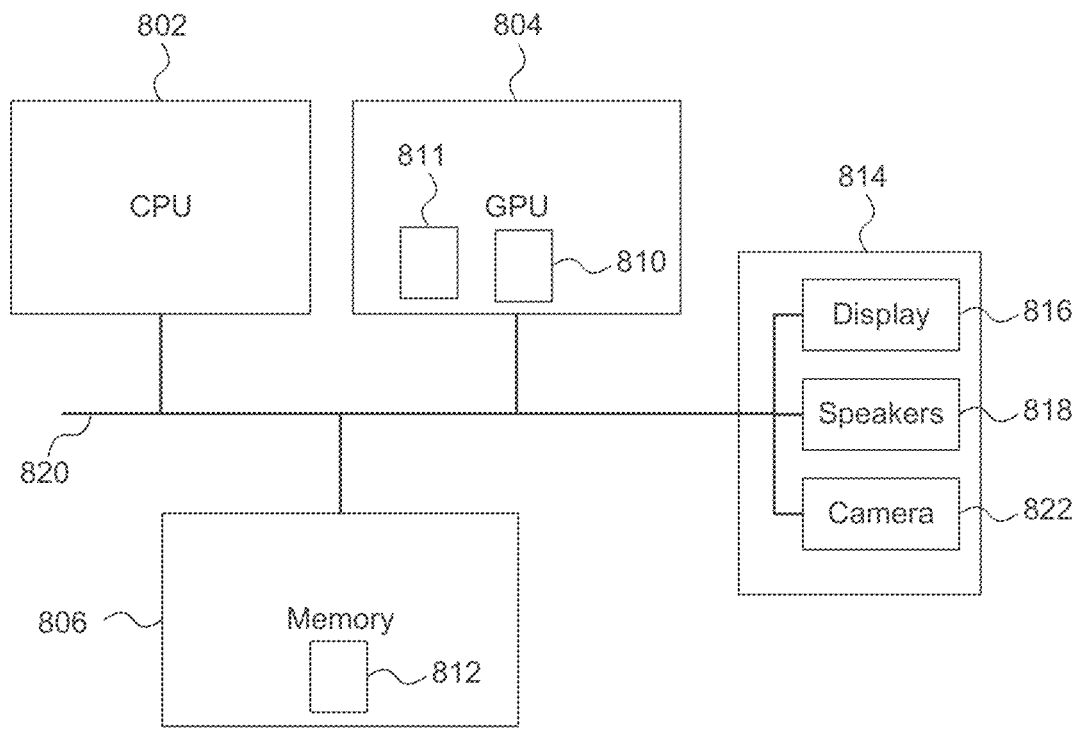
FIG. 8 shows a computer system in which a graphics processing unit comprising a texture filtering unit is implemented.

FIG. 8 shows a computer system in which the texture filtering units described herein may be implemented. The computer system comprises a CPU 802, a GPU 804, a memory 806 and other devices 814, such as a display 816, speakers 818 and a camera 822. The GPU 804 may correspond with the GPU 302 shown in FIG. 3. A texture filtering unit 810 (corresponding to texture filtering unit 306) is implemented on the GPU 804, as well as a Neural Network Accelerator (NNA) 811. In other examples, the texture filtering unit 810 may be implemented on the CPU 802 or within the NNA 811 or as a separate processing unit in the computer system. The components of the computer system can communicate with each other via a communications bus 820. A store 812 (corresponding to memory 304) is implemented as part of the memory 806.

The texture filtering unit 306 may comprise a number of functional blocks. This is schematic only and is not intended to define a strict division between different logic elements of such entities. Each functional block may be provided in any suitable manner. It is to be understood that intermediate values described herein as being formed by a texture filtering unit need not be physically generated by the texture filtering unit at any point and may merely represent logical values which conveniently describe the processing performed by the texture filtering unit between its input and output.

The texture filtering units described herein may be embodied in hardware on an integrated circuit. The texture filtering units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a texture filtering unit or a graphics processing unit configured to perform any of the methods described herein, or to manufacture a texture filtering unit or a graphics processing unit comprising any apparatus described herein. An integrated circuit definition dataset may be, for example, an integrated circuit description.

Therefore, there may be provided a method of manufacturing, at an integrated circuit manufacturing system, a texture filtering unit or a graphics processing unit as described herein. Furthermore, there may be provided an integrated circuit definition dataset that, when processed in an integrated circuit manufacturing system, causes the method of manufacturing a texture filtering unit or a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a texture filtering unit or a graphics processing unit will now be described with respect to FIG. 9.

Figure 9:
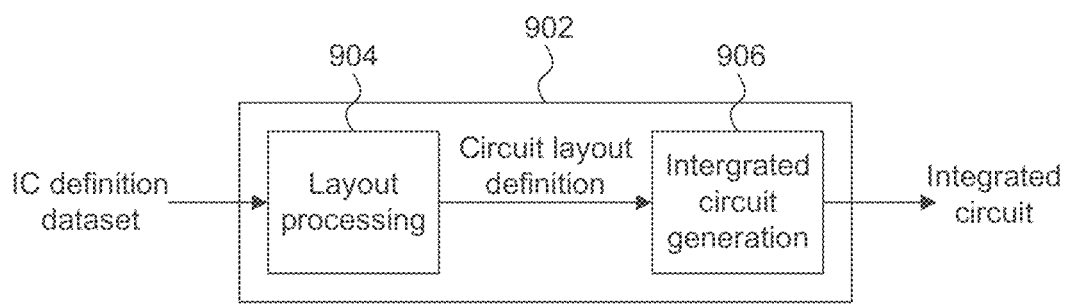
FIG. 9 shows an integrated circuit manufacturing system for generating an integrated circuit embodying a texture filtering unit and/or a graphics processing unit comprising a texture filtering unit.

FIG. 9 shows an example of an integrated circuit (IC) manufacturing system 902 which is configured to manufacture a texture filtering unit or a graphics processing unit as described in any of the examples herein. In particular, the IC manufacturing system 902 comprises a layout processing system 904 and an integrated circuit generation system 906. The IC manufacturing system 902 is configured to receive an IC definition dataset (e.g. defining a texture filtering unit or a graphics processing unit as described in any of the examples herein), process the IC definition dataset, and generate an IC according to the IC definition dataset (e.g. which embodies a texture filtering unit or a graphics processing unit as described in any of the examples herein). The processing of the IC definition dataset configures the IC manufacturing system 902 to manufacture an integrated circuit embodying a texture filtering unit or a graphics processing unit as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a texture filtering unit or a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Annex:

In order to define the parametric texture filters that are implemented in examples described above (e.g. implemented by the texture filtering unit 306), a mathematical description of texture filters is provided in this annex. The explanation provided in this Annex is by way of example only, and should not be understood to be limiting to the scope of the claims.

Texture Filter Definition

Here we define texture filters in terms of a linear operator F acting on an element T of a (complete inner product) function space, which may be identified with the kernel f: $\mathbb{R}^N \times \mathbb{R}^N \to \mathbb{R}$ of an integral transform of the form:

$$\langle x|.F \circ T \rangle = \int dx'^N T(x') f(x,x')$$

The kernel can be any generalised function, such as the Dirac delta function, so this definition is quite general (and may be seen as the infinite-dimensional analog of matrix multiplication).

This general definition of a kernel does not impose any form of translational symmetry and in some cases we may wish to apply a non-uniform operation on a given source image. However, we shall now refer to the texture filter as the kernel associated with a single point of the output image $$f_x(x-x') = f(x,x')$$

The subsequent analysis is not concerned with this plurality of functions (indexed by x) so we shall dispense with the subscript notation. We impose the following constraints on f: non-negativity, normalisation and centrality, i.e.:

$$\forall x \in \mathbb{R}^N f(x) \geq 0$$

$$\int dx^N f(x) = 1$$

$$\int dx_N f(x) x = 0$$

With these constraints, texture filters may be identified with probability distributions. The first constraint may not be true of all useful filters, but it is an essential requirement of the parametric texture filtering framework (or at least the framework is valid to the extent that this constraint is respected). The second and third constraints are non-essential, but do reflect standard practice and simplify the discussion here. Note that the standard nearest neighbour, bilinear and trilinear filters all satisfy these requirements, as do the more general cardinal B-splines (which include the box (Fourier) and the tent (Bartlett), from which the former filters are derived, as the lowest order examples) up to the Gaussian limit.

Equivalence Class

The classic texture mapping literature makes several assumptions on the form of kernels utilised in texture filtering to ensure closure of operations. In particular, the desire to define separable kernels (so that convolution can be decomposed across perpendicular axes) that have circular symmetry in the image plane leads one to Gaussian distributions, which are additionally closed under convolution (aka the central limit theorem). Circular symmetry leads to a discussion of ellipses for anisotropic texture maps and separability, along with closure under convolution, justifies the decomposition of texture filtering into the isotropic and anisotropic filtering stages. However, in practice, Gaussians (owing to their relatively high computation cost) are not typically employed as texture filters and numerous (often ad hoc) attempts have been to made approximate alternative footprints in the image plane (for example with parallelograms). Furthermore, while Gaussians are in some sense the ideal anti-aliasing filter (minimising the product of spatial and spectral width), they are usually considered sub-optimal from the viewpoint of image reconstruction in that they tend to excessively blur images. Nevertheless, the standard texture filters assume the form of low order cardinal B-splines that can be considered approximations of the Gaussian (thanks again to the central limit theorem, repeated convolution of such functions tends to the Gaussian) and similarly suffer from some of the perceived reconstruction quality defects.

It is actually a remarkably straightforward business to generalise the established analysis to cover the real world use cases as well as address the supposed compromises involved in facilitating efficient texture mapping. We are forced to restrict ourselves to probability distributions kernels, but we will see (in spite of the fact that texture filters already generally fall into this category) that this is not a limitation in achieving quality reconstruction. The key insight lies in recognising that the local affine mappings and convolutions of Gaussians map to an algebra, via the covariance matrix, and that this holds for all probability distributions. Provided we are prepared to sacrifice closure under the operations in terms of the kernels themselves, we can legitimately extend the filtering algebra from Gaussians to all candidate filters.

To that end, the parametric texture filtering framework defines an equivalence class on the space of kernels with the following equivalence relation ~:

$$f \sim g \Leftrightarrow \overline{xx^T}_f = \overline{xx^T}_g$$

where the suggestive notation $\overline{xx^T}_f$ denotes the covariance matrix of the kernel f:

$$\overline{xx^T}_f = \frac{1}{|f|} \int dx^N f(x)(x - \bar{x}_f)(x - \bar{x}_f)^T$$

The symbol $\bar{x}_f$ represents the mean of the kernel:

$$\bar{x}_f = \frac{1}{|f|} \int dx^N f(x) x$$

and the symbol |f| may be considered to represent the pseudonorm:

$$|f| = \int dx^N f(x)$$

With our probability distribution kernel constraints $\bar{x}_f = 0$ and |f|=1. Although our equivalence class does not in any case differentiate between varying means and pseudonorms, we retain these terms both for the sake of generality and to show that our distribution space is closed under the key operations.

We immediately see that $\overline{xx^T}_f$ is the canonical projection map from the space of kernels K to the quotient space K/~.

What this means in practice is that as far as the parametric texture filtering framework is concerned, we only care about a given kernel's covariance. Other properties, including mathematical properties such as continuity, support and spectral characteristics and practical considerations such as computational complexity and implementation details, are an orthogonal concern that can be guided by application requirements. This should provide maximum flexibility to a designer who can be confident that their filter will integrate appropriately into the parametric texture filtering pipeline.

Class Invariants

We now show (the elementary results) that convolution and affine mapping are class invariant properties of the quotient space K/~.

Starting with convolution, we first of all have the multiplicative (homomorphism) property of the pseudonorm:

$$|f * g| = \int dx^N \int dx'^N f(x - x')g(x')$$
$$= |f||g|$$

Secondly, we have the additive (homomorphism) property of the mean:

$$\bar{x}_{f*g} = \frac{1}{|f*g|} \int dx^N \int dx'^N f(x - x')g(x')x$$

$$= \frac{1}{|f||g|} \int dx^N \int dx'^N f(x)g(x')(x + x')$$

$$= \frac{1}{|f|} \int dx^N f(x)x + \frac{1}{|g|} \int dx^N g(x)x$$

$$= \bar{x}_f + \bar{x}_g$$

These two properties in isolation ensure that our restricted set of kernels are closed under convolution, as one might expect. Lastly, we have the additive (homomorphism) property of the covariance:

$$\overline{xx^T}_{f*g} = \frac{1}{|f*g|} \int dx^N \int dx'^N f(x - x')g(x')(x - \bar{x}_{f*g})(x - \bar{x}_{f*g})^T$$

$$= \frac{1}{|f||g|} \int dx^N \int dx'^N f(x)g(x')(x + x' - \bar{x}_f - \bar{x}_g)(x + x' - \bar{x}_f - \bar{x}_g)^T$$

$$= \frac{1}{|f|} \int dx^N f(x)(x - \bar{x}_f)(x - \bar{x}_f)^T + \frac{1}{|g|} \int dx^N g(x)(x - \bar{x}_g)(x - \bar{x}_g)^T$$

$$= \overline{xx^T}_f + \overline{xx^T}_g$$

Convolution thus forms the additive component of our texture filtering algebra.

The action of an affine mapping on a kernel can be seen as a coordinate transformation. It has no effect on the pseudonorm:

$$|\phi, f| = \frac{1}{\det\phi} \int dx^N f(\phi^{-1}(x)) = \int dx^N f(x) = |f|$$

The mean transforms according to the affine transform matrix M:

$$\bar{x}_{\phi,f} = \frac{1}{|\phi, f|} \frac{1}{\det\phi} \int dx^N f(\phi^{-1}(x)) x = \frac{1}{|f|} \int dx^N f(x) Mx = M\bar{x}_f$$

While the translation component of the transform can shift the mean of the kernel away from the origin, the coordinate system can be adjusted so that an affine transform effectively becomes a linear transform and we retain the closure property of our constrained probably distribution kernels.

We have the following multiplicative property of the covariance:

$$\overline{xx^T}_{\phi,f} = \frac{1}{|\phi, f|} \frac{1}{\det\phi} \int dx^N f(\phi^{-1}(x))(x - \bar{x}_{\phi,f})(x - \bar{x}_{\phi,f})$$

$$= \frac{1}{|f|} \int dx^N f(x)(Mx - M\bar{x}_f)(Mx - M\bar{x}_f)^T$$

$$= M\overline{xx^T}_f M^T$$

Affine mapping thus forms the multiplicative component of our texture filtering algebra.

Sampling

We can define, in our (generalised) function space, a sampling operation, using the space-variant $\Pi_x$:

$$\Pi_x(x-x') = \sum_n \delta(x-x_n)\delta(x-x')$$

where $\{x_n\}_{n\in U \subset N}$ are a set of distinct sampling points associated with the sampling kernel. We see immediately that the kernel has zero pseudonorm on the complement of the sampling points:

$$|\Pi_x| = \sum_n \delta(x-x_n)$$

and that both mean and covariance are zero on the sampling points and undefined elsewhere:

$$\overline{xx^T}_{\Pi_n} = \overline{x}_{\Pi_x} = \begin{cases} 0 & \text{if } x \in \{x_n\} \\ \text{undefined} & \text{otherwise} \end{cases}$$

In other words, we can treat our sampling operation as family of identity operations in the quotient space, restricted to the set of sampling points. Naturally, convolution, acting to the right, simply selects the right operand at the sample location:

$$\Pi_x * f = \sum_n \int dx'^N \delta(x-x_n)\delta(x-x')f(x') = \sum_n \delta(x-x_n)f(x)$$

More generally, the additive covariance property of convolution holds for any space-variant kernel, acting to the right.

Convolution, acting to the left, necessitates parameterisation over the sample locations, so for constant x', we have (applying integral transform composition)

$$(f*\Pi)_x = \int dx''^N f(x-x'')\Pi_{x''}(x''-x') =$$
$$\sum_n \int dx''^N f(x-x'')\delta(x''-x_n)\delta(x''-x') = \sum_n (x-x'-(x-x_n))$$

The result is another (in general) space variant kernel, which at each location can be expressed as a sum of weighted samples (i.e. delta functions), according to a kernel f. The pseudonorm of this composite kernel is:

$$|(f*\Pi)_x| = \sum_n \int dx'^N f(x-x_n)\delta(x'-(x-x_n)) = \sum_n f(x-x_n)$$

We refer to f as a reconstruction kernel if the pseudonorm is non-zero for all x and sometimes more narrowly if the pseudonorm is one everywhere. The mean of the composite kernel has the following predictable structure:

$$\overline{x}_{(f*\Pi)_x} = \frac{1}{|(f*\Pi)_x|} \sum_n f(x-x_n)(x-x_n)$$

Similarly, the covariance off is discretised by the left-action of the sampling operator:

$$\overline{xx^T}_{(f*\Pi)_x} = \frac{1}{|(f*\Pi)_x|} \sum_n f(x-x_n)(x-x_n-\overline{x}_{f*\Pi})(x-x_n-\overline{x}_{f*\Pi})^T$$

We see from the above that the insertion of a sampling operator into a chain of convolutions breaks the space invariant symmetry and discretises the first kernel on the left, but otherwise plays well with the covariance quotient space. We wish to be able to ignore the effect of sampling by treating it as some approximation process that doesn't fundamentally alter the character of any previous or subsequent operations. With this in mind, we observe that the space average (defined in some suitable sense) parameters are consistent with the sampling operation not being present.

$$\int d\Omega |(f*\Pi)_x| = \int d\Omega \sum_n f(x-x_n) = \int dx'^N f(x) = |f|$$

$$\int d\Omega \overline{x}_{(f*\Pi)_x} = \int d\Omega \frac{1}{|(f*\Pi)_x|} \sum_n f(x-x_n)(x-x_n) = \frac{1}{|f|}\int dx^N f(x)x = \overline{x}_f$$

$$\int d\Omega \overline{xx}_{(f*\Pi)_x} =$$

$$\int d\Omega \frac{1}{|(f*\Pi)_x|} \sum_n f(x-x_n)(x-x_n-\overline{x}_{f*\Pi})(x-x_n-\overline{x}_{f*\Pi})^T =$$

$$\frac{1}{|f|}\int dx^N f(x)(x-\overline{x}_f)(x-\overline{x}_f)^T = \overline{xx^T}_f$$

While some attempts have been made (including by the present author) to incorporate the space variant nature of a sampled reconstruction filter into the forthcoming kernel parameterisation discussion, there are other quality and performance factors to take into consideration and for a general analysis, it is simpler to assume that we are dealing with the average filter response and that the effect of sampling can be neglected henceforth.

Standard Texture Pipeline

The standard texture pipeline, as described above with reference to FIG. 2, can be interpreted as the following texture operations:

$$\phi_t(a*T*M)$$

where M is a collection of kernels associated with the mipmap generation, T is a kernel associated with the texture filter, A is a kernel associated with the anisotropic filter and ϕ is the texture mapping from texture space to screen space.

Kernel Parameters

Texture filters are defined in terms of the resolution of each mipmap level and as such they share a coupled parameter λ. The covariance of T*M is thus given by $$\frac{1}{2}\log_2 \overline{xx^T}_{T*M} = (\lambda - \beta + c)I$$

where c is a constant and β is referred to as the sampler bias, which gives an indication as to the sampling rate at which each mipmap level, taking into account the intended texture filter, was generated.

The anisotropic filter, A, is parameterised by the anisotropic ratio η, the stepping length σ, the minor axis level of detail λ (not necessarily related to the above) and the direction of anisotropy, which for 2D textures can be described in terms of the angle, relative to the horizontal texture axis. The covariance is given by:

$$\frac{1}{2}\log_2 \overline{xx^T}_{A(\eta,\sigma,\phi,\lambda)} = \begin{pmatrix} \cos\phi & -\sin\phi \\ \sin\phi & \cos\phi \end{pmatrix} \begin{pmatrix} \mu+\omega+c & 0 \\ 0 & 0 \end{pmatrix} \begin{pmatrix} \cos\phi & \sin\phi \\ -\sin\phi & \cos\phi \end{pmatrix}$$

where c is the same constant, $\omega = \log_2 \sigma$ is the logarithmic stepping length, and $\mu$ is the major axis level of detail, given by $$\mu = \lambda + \log_2 \eta$$

After composition, we have $$\frac{1}{2}\log_2 \overline{xx^T}_{A*T*M} = \frac{1}{2}\log_2\left(\overline{xx^T}_A + \overline{xx^T}_{T*M}\right) =$$

$$\begin{pmatrix} \cos\phi & -\sin\phi \\ \sin\phi & \cos\phi \end{pmatrix} \begin{pmatrix} \frac{1}{2}\log_2(2^{2(\mu+\omega)} + 2^{2(\lambda+\beta)}) & 0 \\ 0 & \lambda - \beta \end{pmatrix} \begin{pmatrix} \cos\phi & \sin\phi \\ -\sin\phi & \cos\phi \end{pmatrix} + cI$$

Parameter Calculation

For a target covariance, determined by the screen space (or otherwise application determined) sampling requirements, the above kernel parameters can be determined. While any covariance can in principle be specified, the standards mandate an isotropic covariance is employed:

$$\frac{1}{2}\log_2 \overline{xx^T}_{(A*T*M)} = (c + \beta_x)I$$

where the constant c canonically matches that of the mipmap and anisotropic kernel definitions and $\beta_x$ is a per-sample shader bias. Note that unlike the sampler bias, which can be interpreted as conveying sampling rate information about mipmap generation, the shader bias is allowed to vary arbitrarily from one point to the next so it is more naturally seen as controlling the screen space kernel size (even though ultimately the effect will be to select different resolution mipmap levels much in the same way as the sampler bias). We stress here that this is an interpretation that is made in anticipation of the parametric texture filtering framework and doesn't represent a commonly accepted interpretation in the default cause and has no meaningful distinction.

$$\frac{1}{2}\log_2 \overline{xx^T}_{A*T*M} = \frac{1}{2}\log_2 JJ^T + (c + \beta_x)I$$

where $\mu_0$ is the base major axis level of detail and $\lambda_0$ is the base minor axis level of detail:

$$\frac{1}{2}\log_2 \overline{xx^T}_{A*T*M} = \begin{pmatrix} \cos\phi & -\sin\phi \\ \sin\phi & \cos\phi \end{pmatrix} \begin{pmatrix} \mu_0 & 0 \\ 0 & \lambda_0 \end{pmatrix} \begin{pmatrix} \cos\phi & \sin\phi \\ -\sin\phi & \cos\phi \end{pmatrix} + (c + \beta_x)I$$

$$\lambda = \lambda_0 + \beta_x + \beta$$

Note that the anisotropic filter is under constrained but if we set $$\mu = \mu_0 + \beta_x + \beta$$

thereby ensuring the anisotropy of the filter matches the anisotropy of the texture mapping (i.e. $\mu - \lambda = \mu_0 - \lambda_0$)

$$\mu - \beta = \mu_\beta + \beta_x = \frac{1}{2}\log_2(2^{2(\mu+\omega)} + 2^{2(\lambda+\beta)}) \Rightarrow 2^{2(\omega+\beta)} =$$

$$1 - 2^{2(\omega+\beta)} \Rightarrow \omega = \frac{1}{2}\log_2(1 - 2^{2\alpha}) - \beta \Rightarrow \sigma = 2^{-\beta}\sqrt{1-\eta^2}$$

Parametric Texture Pipeline

Figure 10:
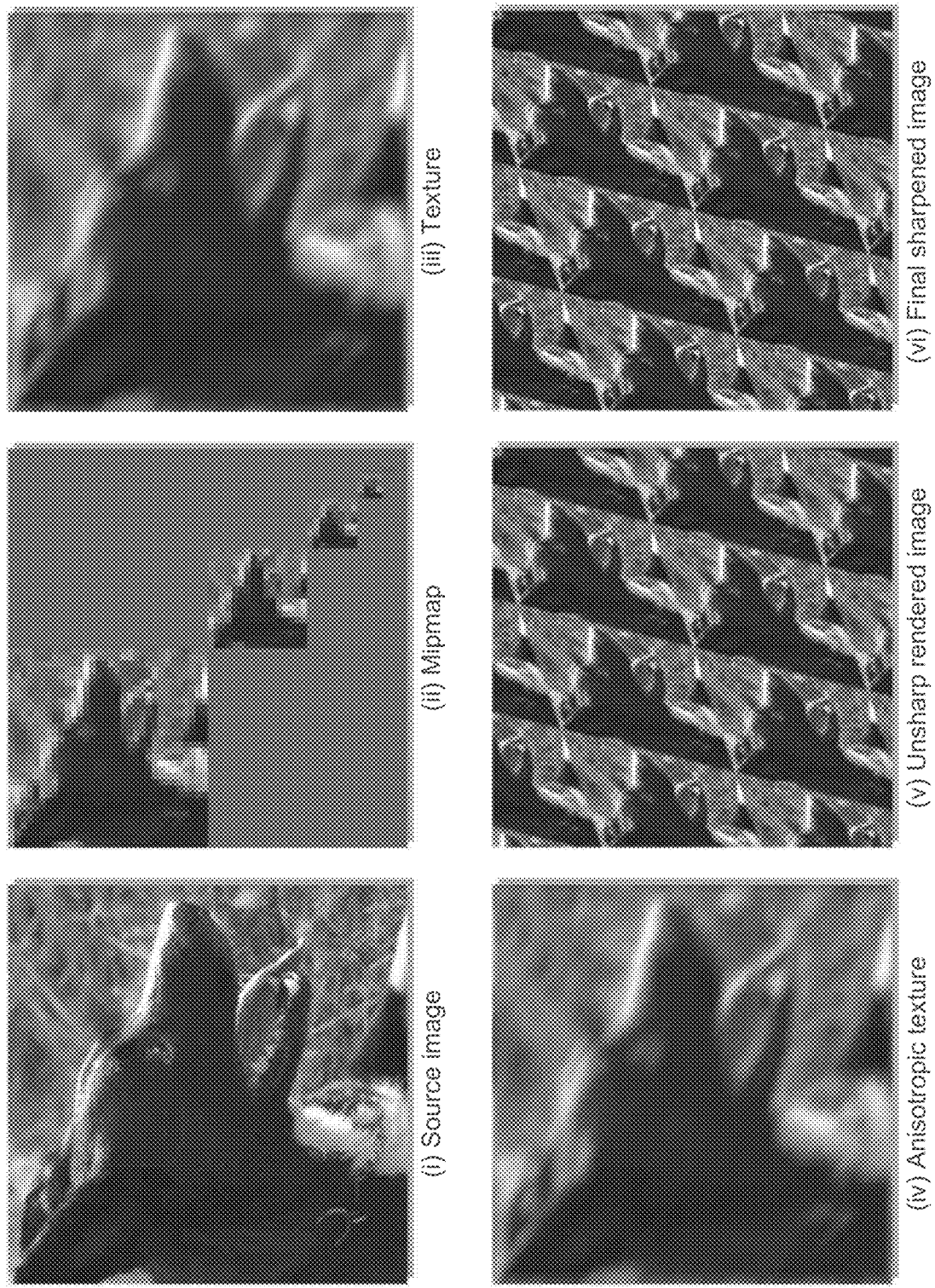
FIG. 10 shows example images representing different stages of a second texture filtering pipeline.

FIG. 10 shows example images representing different stages of a parametric texture filtering pipeline which facilitates variable rate sampling, while maintaining feasible bounds on bandwidth and computational complexity. It has five stages: (a) mipmap generation in which a mipmap (as shown in FIG. 10(ii)) is generated from the source image (as shown in FIG. 10(i)), (b) parametric texture filtering in which a texture (as shown in FIG. 10(iii)) is generated from the mipmap by the parametric texture filter, (c) anisotropic filtering in which multiple texture samples are combined to form an anisotropic texture (as shown in FIG. 10(iv)), (d) texture mapping in which the texture is mapped onto a surface in image space to form part of a rendered image (as shown in FIG. 10(v)), and (e) an optional sharpening stage in which the image is sharpened based on knowledge of the way in which it can be filtered previously in the pipeline. It is noted that the parametric texture filtering in step (b) can use the intrinsic ability of the parametric texture filter to alter the LOD and/or the anisotropy of the filtered texture values, e.g. such that the texture shown in FIG. 10(iii) may include some anisotropy. The optional sharpening stage may be referred to as an optional deconvolution (post-sharpening) stage.

The pipeline shown in FIG. 10 can be interpreted as the following texture operations:

$$S*\phi_*(A*P*M)$$

where M is a collection of kernels associated with the mipmap generation, P is one or more kernels associated with the parametric texture filter, A is a kernel associated with the anisotropic filter, $\phi$ is the texture mapping from texture space to screen space and S is a kernel associated with post-sharpening filter.

Alternatively, in the context of unsharpened render targets, texture mapping can be seen as an element of a more general image sampling problem such as that which appears in 3D graphics, whereby a render target is generated with a set of probability distribution kernels defined at each sampling point and the deconvolution stage is performed after the final (unsharp) render target has been computed (this includes the effects of lighting calculations and antialiasing of object boundaries).

Parametric Texture Filter Definition

In accordance with our earlier definition, a texture filter is a non-negative kernel $T_\lambda:R^N \rightarrow R$ with a logarithmic scale factor $\lambda$. We use $T:R \rightarrow K$ to mean the function that maps the isotropic LOD $\lambda$ to the kernel f via:

$$f = T(\lambda)$$

Without an associated mipmap structure, we cannot map this to the quotient space.

We define a parametric texture filter as a non-negative kernel with an image level l, a minor parametric level of detail $\pi_\lambda$, a major parametric level of detail $\pi_\mu$ and an angular direction of anisotropy $\phi$. In addition, a parametric texture filter is characterised by the following three limits in the half-open unit interval:

$$(\pi_{min}, \pi_{max}, \pi_{aniso}) \in [0,1)^3 \quad \pi_{max} \leq \pi_{min}$$

which are used to restrict the domain of definition for the parametric texture filter:

$$I_2(\pi_{min},\pi_{max},\pi_{aniso})=\{(\pi_\lambda,\pi_\mu)\in R^2|\pi_{min}\le\pi_\lambda\le\pi_{max},$$
$$\pi_\mu\le\max\{\pi_\lambda,\pi_{aniso}\}\}$$

We use $P:N\times I_2(\pi_{min},\pi_{max},\pi_{aniso})\times(-\pi/2,\pi/2]\to K/\sim$ to mean the function that maps the parametric texture filter parameters to the kernel f in the covariance quotient space via:

$$f = P(l,\pi_\lambda,\pi_\mu 2 \phi)$$

Kernel Parameters

The covariance of the combined parametric texture filtering and mipmap generation stage is parameterised as follows:

$$\frac{1}{2}\log_2 \overline{xx^T}_{P*M(l,p_\lambda,p_\mu,\phi,\beta)} =$$

$$\begin{pmatrix}\cos\phi & -\sin\phi \\ \sin\phi & \cos\phi\end{pmatrix}\begin{pmatrix}p_\mu(\beta) & 0 \\ 0 & p_\lambda(\beta)\end{pmatrix}\begin{pmatrix}\cos\phi & \sin\phi \\ -\sin\phi & \cos\phi\end{pmatrix} + (l+c-\beta)I$$

where c is a constant, $\beta$ is the sampler bias, l is the mipmap level and $p_\mu(\beta)$ and $p_\lambda(\beta)$ are the major and minor parametric levels of detail respectively.

When the sampler bias is zero, the values $p_\mu(0)$ and $p_\lambda(0)$ directly correspond to the intrinsic LOD-like parameters of the parametric texture filter. The parametric texture filter is therefore not a function of the bias and can be written:

$$P(l,p_\lambda(0),p_\mu(0),\phi)$$

To ensure consistency with the standard texture pipeline we assume that default parameters i.e. when $\lambda_\lambda=0$ and $\pi_\mu=0$ generate the same sampler bias covariance scaling. This is guaranteed with $$\forall \beta\ \pi_\lambda=0\Rightarrow p_\lambda 0\ \pi_\mu=0\Rightarrow p_\mu=0$$

Since we have that $$\overline{xx^T}_{P*M(l,p_\lambda,p_\mu,\phi,\beta)} = \overline{xx^T}_{P(l,\pi_\lambda,\pi_\mu,\phi)}+\overline{xx^T}_{M(l,\beta)}$$

we can write $$\overline{xx^T}_{M(l,\beta)}-\overline{xx^T}_{M(l,0)}\overline{xx^T}_{P*M(l,p_\lambda,p_\mu,\phi,\beta)}-\overline{xx^T}_{P*M(l,p_\lambda,p_\mu,\phi,0)}$$

and $$2^{-2\beta}I - I =$$

$$2^{-2(l+c)}\left(\overline{xx^T}_{M(l,\beta)} - \overline{xx^T}_{M(l,0)}\right) = \begin{pmatrix}2^{-2(p_\mu-\beta)}-2^{-2\pi_\mu} & 0 \\ 0 & 2^{-2(p_\lambda-\beta)}-2^{-2\pi_\lambda}\end{pmatrix}$$

We have the mappings $$\begin{pmatrix}p_\mu & 0 \\ 0 & p_\lambda\end{pmatrix} = \frac{1}{2}\log_2\begin{pmatrix}1+2^{-2\beta}(2^{2\pi_\mu}-1) & 0 \\ 0 & 1+2^{2\beta}(2^{2\pi_\lambda}-1)\end{pmatrix}$$

$$\begin{pmatrix}\pi_\mu & 0 \\ 0 & \pi_\lambda\end{pmatrix} = \frac{1}{2}\log_2\begin{pmatrix}1+2^{-2\beta}(2^{2p_\mu}-1) & 0 \\ 0 & 1+2^{2\beta}(2^{2p_\lambda}-1)\end{pmatrix}$$

A complementary characterisation of the parametric texture filter describes an additional convolution above the default composition of texture filter and mipmap generation:

$$\frac{1}{2}\log_2\overline{xx^T}_{P*M} = \frac{1}{2}\log_2\left(\overline{xx^T}_P + \overline{xx^T}_M\right) = \begin{pmatrix}\cos\phi & -\sin\phi \\ \sin\phi & \cos\phi\end{pmatrix}$$

-continued $$\begin{pmatrix}\frac{1}{2}\log_2(2^{2(l+\omega_\mu)}+2^{2(l-\beta)}) & 0 \\ 0 & \frac{1}{2}\log_2(2^{2(l+\omega_\lambda)}+2^{2(l-\beta)})\end{pmatrix}\begin{pmatrix}\cos\phi & \sin\phi \\ -\sin\phi & \cos\phi\end{pmatrix} + cI$$

By equating this with the parametric level of detail, we have the following relationship:

$$\begin{pmatrix}p_\mu & 0 \\ 0 & p_\lambda\end{pmatrix} + (l-\beta)I =$$

$$\begin{pmatrix}\frac{1}{2}\log_2(2^{2(l+p_\mu+\omega_\mu)}+2^{2(l-\beta)}) & 0 \\ 0 & \frac{1}{2}\log_2(2^{2(l+p_\lambda+\omega_\lambda)}+2^{2(l-\beta)})\end{pmatrix} \Rightarrow \begin{pmatrix}\omega_\mu & 0 \\ 0 & \omega_\lambda\end{pmatrix} =$$

$$\begin{pmatrix}\frac{1}{2}\log_2(1-2^{-2p_\mu})-\beta & 0 \\ 0 & \frac{1}{2}\log_2(1-2^{-2p_\lambda})-\beta\end{pmatrix}$$

$$\frac{1}{2}\log_2\overline{xx^T}_{A*P*M} = \frac{1}{2}\log_2\left(\overline{xx^T}_{A(\eta,\sigma,\phi,l)} + \overline{xx^T}_{P*M}\right) = \begin{pmatrix}\cos\phi & -\sin\phi \\ \sin\phi & \cos\phi\end{pmatrix}$$

$$\begin{pmatrix}\frac{1}{2}\log_2(2^{2(\mu-P_\mu+\omega)}+2^{2(l+p_\mu-\beta)}) & 0 \\ 0 & l+p_\lambda-\beta\end{pmatrix}\begin{pmatrix}\cos\phi & \sin\phi \\ -\sin\phi & \cos\phi\end{pmatrix} + cI$$

What is claimed is:

1. A method of applying texture filtering to a texture using a texture filtering unit, wherein the texture is represented with a mipmap comprising a plurality of levels, wherein each level of the mipmap comprises an image representing the texture at a respective level of detail, wherein the texture filtering unit has minimum and maximum limits on an amount by which it can alter the level of detail when it filters texels from an image of a single level of the mipmap, wherein a range of level of detail between the minimum and maximum limits defines an intrinsic region of the texture filtering unit, and wherein levels of detail outside of the range of level of detail between the minimum and maximum limits define an extrinsic region of the texture filtering unit, the method comprising:
   receiving an input level of detail for filtering the texture;
   determining whether the received input level of detail is in an intrinsic region or an extrinsic region of the texture filtering unit;
   if it is determined that the received input level of detail is in an intrinsic region of the texture filtering unit:
      reading texels from a single mipmap level of the mipmap; and
      filtering the read texels from the single mipmap level with the texture filtering unit to determine a filtered texture value representing part of the texture at the input level of detail; and
   if it is determined that the received input level of detail is in an extrinsic region of the texture filtering unit:
      reading texels from two mipmap levels of the mipmap; and
      processing the read texels from the two mipmap levels with the texture filtering unit to determine a filtered texture value representing part of the texture at the input level of detail.

2. The method of claim 1, wherein a first of the two mipmap levels is associated with a first intrinsic region of the texture filtering unit, wherein a second of the two mipmap levels is associated with a second intrinsic region of the texture filtering unit, and wherein said processing the read texels from the two mipmap levels with the texture filtering unit comprises:
  filtering the read texels from the first of the two mipmap levels with the texture filtering unit to determine a first intermediate filtered texture value at a first intermediate level of detail within the first intrinsic region of the texture filtering unit;
  filtering the read texels from the second of the two mipmap levels with the texture filtering unit to determine a second intermediate filtered texture value at a second intermediate level of detail within the second intrinsic region of the texture filtering unit; and
  determining a filtered texture value representing part of the texture at the input level of detail by using the input level of detail to interpolate between the first intermediate filtered texture value at the first intermediate level of detail and the second intermediate filtered texture value at the second intermediate level of detail.

3. The method of claim 1, wherein the texture filtering unit has a plurality of intrinsic regions and extrinsic regions, wherein there is an intrinsic region and an extrinsic region for each of a plurality of the mipmap levels of the mipmap.

4. The method of claim 1, wherein the texture filtering unit performs filtering in accordance with a filtering function which is non-negative, normalised and has a mean value of zero.

5. The method of claim 1, wherein the texture filtering unit is configured to filter texels using a filter kernel, wherein values of the filter kernel can be varied to alter a variance of the filtering performed by the texture filtering unit so as to vary the amount by which the level of detail is altered between the minimum and maximum limits, and wherein the method comprises setting the values of the filter kernel based on the received input level of detail to control the amount by which it alters the level of detail when it filters the texels.

6. The method of claim 1, wherein said determining whether the received input level of detail is in an intrinsic region or an extrinsic region of the texture filtering unit comprises:
  determining a first indication of a mipmap level, $d_{hi}$, such that $d_{hi}=\lfloor d_I - p_{min}^\lambda \rfloor$; and
  determining a second indication of a mipmap level, $d_{lo}$, such that $d_{lo}=\lceil d_I - p_{max}^\lambda \rceil$;
  wherein $d_I$ is the received input level of detail, $p_{min}^\lambda$ is the minimum limit and $p_{max}^\lambda$ is the maximum limit, and wherein the received input level of detail is in an intrinsic region if $d_{hi}=d_{lo}$, and wherein the received input level of detail is in an extrinsic region if $d_{hi} \neq d_{lo}$.

7. The method of claim 6, wherein $0 \leq p_{min}^\lambda \leq p_{max}^\lambda < 1$.

8. The method of claim 6, wherein if it is determined that the received input level of detail is in an intrinsic region of the texture filtering unit:
  texels are read from the single mipmap level of the mipmap indicated by $d_{hi}$ and $d_{lo}$; and
  a parameter $p^\lambda$ is set to determine the amount by which the level of detail is altered from the single mipmap level with the texture filtering unit, wherein $p^\lambda = d_I - d_{hi} = d_I - d_{lo}$.

9. The method of any of claim 6, wherein if it is determined that the received input level of detail is in an extrinsic region of the texture filtering unit:
  texels are read from the two mipmap levels of the mipmap indicated by $d_{hi}$ and $d_{lo}$;
  a parameter $p_{hi}^\lambda$ is set to determine the amount by which the level of detail is altered from a first of the two mipmap levels indicated by $d_{hi}$ with the texture filtering unit; and
  a parameter $p_{lo}^\lambda$ is set to determine the amount by which the level of detail is altered from a second of the two mipmap levels indicated by $d_{lo}$ with the texture filtering unit.

10. The method of claim 9, wherein $p_{hi}^\lambda = p_{max}^\lambda$ and $p_{lo}^\lambda = p_{min}^\lambda$.

11. The method of claim 9, when dependent upon claim 2, wherein if it is determined that the received input level of detail is in an extrinsic region of the texture filtering unit the method further comprises setting an interpolation factor $\delta$ for interpolating between the first intermediate filtered texture value at the first intermediate level of detail and the second intermediate filtered texture value at the second intermediate level of detail,
  wherein the first intermediate level of detail is $d_{hi}+p_{hi}^\lambda$ and the second intermediate level of detail is $d_{lo}+p_{lo}^\lambda$ and wherein $$\delta = \frac{d_I - p_{max}^\lambda - d_{hi}}{1 - (p_{max}^\lambda - p_{min}^\lambda)}.$$

12. The method of claim 1, further comprising:
  receiving a bias parameter indicating a width of a filter used to generate the images at the mipmap levels of the mipmap; and
  adjusting the minimum and maximum limits of the texture filtering unit based on the received bias parameter.

13. The method of claim 1, wherein the texture filtering unit is configured to apply anisotropic filtering using a filter kernel which can be adapted to apply different amounts of anisotropy up to a maximum amount of anisotropy, wherein the method comprises:
  receiving an indication of an input amount of anisotropy and an input direction of anisotropy for filtering the texture;
  determining whether the input amount of anisotropy is above the maximum amount of anisotropy;
  if it is determined that the input amount of anisotropy is not above the maximum amount of anisotropy:
    configuring the filter kernel to apply the input amount of anisotropy; and
    performing a sampling operation to sample texels using the filter kernel to determine a filtered texture value which has been filtered in accordance with the input amount of anisotropy and the input direction of anisotropy; and
  if it is determined that the input amount of anisotropy is above the maximum amount of anisotropy:
    configuring the filter kernel to apply an amount of anisotropy that is not above the maximum amount of anisotropy;
    performing a plurality of sampling operations to sample texels using the filter kernel to determine a respective plurality of intermediate filtered texture values; and
    combining the plurality of intermediate filtered texture values to determine a filtered texture value which has been filtered in accordance with the input amount of anisotropy and the input direction of anisotropy.

14. A texture filtering unit configured to apply texture filtering to a texture, wherein the texture is represented with a mipmap comprising a plurality of levels, wherein each level of the mipmap comprises an image representing the texture at a respective level of detail,
wherein the texture filtering unit has minimum and maximum limits on an amount by which it can alter the level of detail when it filters texels from an image of a single level of the mipmap, wherein a range of level of detail between the minimum and maximum limits defines an intrinsic region of the texture filtering unit, and wherein levels of detail outside of the range of level of detail between the minimum and maximum limits define an extrinsic region of the texture filtering unit, the texture filtering unit being configured to:
receive an input level of detail for filtering the texture;
determine whether the received input level of detail is in an intrinsic region or an extrinsic region of the texture filtering unit;
if it is determined that the received input level of detail is in an intrinsic region of the texture filtering unit:
read texels from a single mipmap level of the mipmap; and
filter the read texels from the single mipmap level to determine a filtered texture value representing part of the texture at the input level of detail; and
if it is determined that the received input level of detail is in an extrinsic region of the texture filtering unit:
read texels from two mipmap levels of the mipmap; and
process the read texels from the two mipmap levels to determine a filtered texture value representing part of the texture at the input level of detail.

15. The texture filtering unit of claim 14, wherein a first of said two mipmap levels is associated with a first intrinsic region of the texture filtering unit, wherein a second of said two mipmap levels is associated with a second intrinsic region of the texture filtering unit, and wherein the texture filtering unit is configured to process the read texels from the two mipmap levels if it is determined that the received input level of detail is in an extrinsic region of the texture filtering unit by:
filtering the read texels from the first of the two mipmap levels to determine a first intermediate filtered texture value at a first intermediate level of detail within the first intrinsic region;
filtering the read texels from the second of the two mipmap levels to determine a second intermediate filtered texture value at a second intermediate level of detail within the second intrinsic region; and
determining a filtered texture value representing part of the texture at the input level of detail by using the input level of detail to interpolate between the first intermediate filtered texture value at the first intermediate level of detail and the second intermediate filtered texture value at the second intermediate level of detail.

16. The texture filtering unit of claim 14, wherein the texture filtering unit has a plurality of intrinsic regions and extrinsic regions, wherein there is an intrinsic region and an extrinsic region for each of a plurality of the mipmap levels of the mipmap.

17. The texture filtering unit of claim 14, wherein the texture filtering unit is configured to apply anisotropic filtering using a filter kernel which can be adapted to apply different amounts of anisotropy up to a maximum amount of anisotropy, wherein the texture filtering unit is further configured to:
receive an indication of an input amount of anisotropy and an input direction of anisotropy for filtering the texture;
determine whether the input amount of anisotropy is above the maximum amount of anisotropy;
if it is determined that the input amount of anisotropy is not above the maximum amount of anisotropy:
set the filter kernel to apply the input amount of anisotropy; and
perform a sampling operation to sample texels using the filter kernel to determine a filtered texture value which has been filtered in accordance with the input amount of anisotropy and the input direction of anisotropy; and
if it is determined that the input amount of anisotropy is above the maximum amount of anisotropy:
set the filter kernel to apply an amount of anisotropy that is not above the maximum amount of anisotropy;
perform a plurality of sampling operations to sample texels using the filter kernel to determine a respective plurality of intermediate filtered texture values; and
combine the plurality of intermediate filtered texture values to determine a filtered texture value which has been filtered in accordance with the input amount of anisotropy and the input direction of anisotropy.

18. The texture filtering unit of claim 14, wherein the texture filtering unit is embodied in hardware on an integrated circuit.

19. A graphics processing unit comprising the texture filtering unit of claim 14, wherein the graphics processing unit is configured to use the filtered texture value determined by the texture filtering unit to render an image of a scene in which the texture is applied to a surface in the scene.

20. A non-transitory computer readable storage medium having stored thereon an integrated circuit definition dataset that, when processed in an integrated circuit manufacturing system, configures the integrated circuit manufacturing system to manufacture a texturing filtering unit which is configured to apply texture filtering to a texture, wherein the texture is represented with a mipmap comprising a plurality of levels, wherein each level of the mipmap comprises an image representing the texture at a respective level of detail, wherein the texture filtering unit has minimum and maximum limits on an amount by which it can alter the level of detail when it filters texels from an image of a single level of the mipmap, wherein a range of level of detail between the minimum and maximum limits defines an intrinsic region of the texture filtering unit, and wherein levels of detail outside of the range of level of detail between the minimum and maximum limits define an extrinsic region of the texture filtering unit, the texture filtering unit being configured to:
receive an input level of detail for filtering the texture;
determine whether the received input level of detail is in an intrinsic region or an extrinsic region of the texture filtering unit;
if it is determined that the received input level of detail is in an intrinsic region of the texture filtering unit:
read texels from a single mipmap level of the mipmap; and
filter the read texels from the single mipmap level to determine a filtered texture value representing part of the texture at the input level of detail; and
if it is determined that the received input level of detail is in an extrinsic region of the texture filtering unit:
read texels from two mipmap levels of the mipmap; and
process the read texels from the two mipmap levels to determine a filtered texture value representing part of the texture at the input level of detail.

* * * * *